United States Patent
Xu et al.

(10) Patent No.: US 11,146,462 B2
(45) Date of Patent: Oct. 12, 2021

(54) NETWORK SLICE MANAGEMENT METHOD, DEVICE, AND SYSTEM

(71) Applicant: HUAWEI TECHNOLOGIES CO., LTD., Shenzhen (CN)

(72) Inventors: Ruiyue Xu, Shanghai (CN); Jun Yang, Shanghai (CN); Yan Li, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/829,111

(22) Filed: Mar. 25, 2020

(65) Prior Publication Data

US 2020/0287800 A1  Sep. 10, 2020

Related U.S. Application Data

(63) Continuation of application No. PCT/CN2018/108897, filed on Sep. 29, 2018.

(30) Foreign Application Priority Data

Sep. 30, 2017 (CN) .......................... 201710940986.4

(51) Int. Cl.
 *G06F 15/173* (2006.01)
 *H04L 12/24* (2006.01)
 *H04W 48/18* (2009.01)

(52) U.S. Cl.
 CPC ............. *H04L 41/50* (2013.01); *H04W 48/18* (2013.01)

(58) Field of Classification Search
 CPC .................................. H04L 41/50; H04W 48/18
 USPC ....................................................... 709/203
 See application file for complete search history.

(56) References Cited

U.S. PATENT DOCUMENTS

2017/0070892 A1  3/2017  Song et al.
2017/0141973 A1*  5/2017  Vrzic ................... H04L 41/5051
2018/0310169 A1  10/2018  Wang

FOREIGN PATENT DOCUMENTS

| CN | 104954220 A | 9/2015 |
| CN | 105635345 A | 6/2016 |
| CN | 106657194 A | 5/2017 |
| CN | 106792888 A | 5/2017 |

(Continued)

OTHER PUBLICATIONS

Huawei, "Add potential solution for creating a network slice instance to support acommunication service", 3GPP TSG SA WG5 (Telecom Management) Meeting #111 Bis, SSA-170115, Feb. 13, 2017, total 2 pages.

*Primary Examiner* — Atta Khan
(74) *Attorney, Agent, or Firm* — Rimon PC

(57) ABSTRACT

This application relates to the field of communications technologies, and discloses a network slice management method, device, and system, to solve the problem of low efficiency of manually deploying a network slice. One example network slice management method comprises obtaining, by a network management unit, the capability description information of a network slice, where the capability description information of the network slice includes at least one of a feature of the network slice and a deployment capability of the network slice. The method further comprises sending, by the network management unit, a notification message carrying the capability description information of the network slice, to a service management unit.

15 Claims, 10 Drawing Sheets

(56) References Cited

FOREIGN PATENT DOCUMENTS

| | | |
|---|---|---|
| CN | 106937362 A | 7/2017 |
| CN | 106954267 A | 7/2017 |
| CN | 107222318 A | 9/2017 |
| CN | 107770794 A | 3/2018 |
| WO | 2017076086 A1 | 5/2017 |
| WO | WO-2017140204 A1 * | 8/2017 ............ H04W 64/00 |

* cited by examiner

NETWORK SLICE MANAGEMENT METHOD, DEVICE, AND SYSTEM

CROSS-REFERENCE TO RELATED APPLICATIONS

This application is a continuation of International Application No. PCT/CN2018/108897, filed on Sep. 29, 2018, which claims priority to Chinese Patent Application No. 201710940986.4, file on Sep. 30, 2017. The disclosures of the aforementioned applications are hereby incorporated by reference in their entireties.

TECHNICAL FIELD

Embodiments of the present application relate to the field of optical communications technologies, and in particular, to a network slice management method, device, and system.

BACKGROUND

More advanced mobile communication technology is used to implement the 5th generation (5G) mobile communications system (5G system). The 5G system can provide a mobile user with a extra capacity bandwidth rate and more secure communication, to satisfy widely varying service requirements in various industries. In the 5G system, a physical network is divided into a plurality of virtual end-to-end networks by using a network slicing technology. Each virtual network may be referred to as a network slice (NS), and the network slices are logically independent. Each network slice includes an independent network function or a function combination instance, and the network slices may provide different service requirements and services, to ensure quality of service of different tenants.

Currently, when a tenant proposes a service requirement to an operator, the operator determines a network requirement based on the service requirement and designs a corresponding network, and proposes a corresponding network or subnet requirement to device manufacturers. The operator and the device manufacturers negotiate for required network resources, and the operator designs a corresponding network slice based on the network resources provided by the device manufacturers, to satisfy the service requirement of the tenant. Such traditional designing procedure needs manual negotiation between the operator and the device manufacturers, leading to inefficiency in network management.

SUMMARY

This application provides a network slice management method, device, and system, to resolve an existing problem of low efficiency of manually deploying a network slice.

To achieve the foregoing objective, the following technical solutions are used in this application.

A first aspect of this application provides a network slice management method, including:
  obtaining, by a network management unit, capability description information of a network slice, where the capability description information of the network slice includes at least one of a feature of the network slice and a deployment capability of the network slice; and
  sending, by the network management unit, a notification message to a service management unit, where the notification message carries the capability description information of the network slice.

Compared with the prior art, in this application, the network management unit obtains the capability description information of the network slice, and sends the capability description information of the network slice to the service management unit, so that the service management unit manages the network slice based on the capability description information of the network slice. To be specific, a capability that can be provided by the network management unit is sent to the service management unit in advance, so that the service management unit automatically manages the network slice based on the capability of the network management unit, avoiding a manually negotiated network planning process, improving network slice management efficiency, and shortening a service online time.

With reference to the first aspect, in a first possible implementation of the first aspect, the method further includes:
  receiving, by the network management unit, deployment information of the network slice sent by the service management unit, and the deployment information of the network slice corresponds to the deployment capability of the network slice; and
  managing, by the network management unit, the network slice based on the deployment information of the network slice.

With reference to the first possible implementation of the first aspect, in a second possible implementation of the first aspect, the managing, by the network management unit, the network slice based on the deployment information of the network slice includes:
  determining, by the network management unit, deployment information of a network component based on the deployment information of the network slice, where the network slice includes at least one network component; and
  sending, by the network management unit, a network slice management request message to a component management unit, where the network slice management request message includes the deployment information of the network component, and the deployment information of the network component is used to deploy the network component.

In this way, a network component management unit may deploy the network component based on the deployment information of the network component, to deploy the network slice.

With reference to the first aspect or any possible implementation of the first aspect, in a third possible implementation of the first aspect, the obtaining, by a network management unit, capability description information of a network slice includes:
  obtaining, by the network management unit, a network slice template, and obtaining the capability description information of the network slice from the network slice template, where the network slice template includes the capability description information of the network slice.

In this way, the capability description information of the network slice may be carried in the network slice template, and because the network slice template may include capability description information of a plurality of network slices, the network management unit may obtain the capability description information of the plurality of network slices from the network slice template, improving a capability of obtaining information by the network management unit.

When the capability description information of the network slice is carried in the network template, the notification message further carries an identifier of the network slice template, and the network slice management request message further carries the identifier of the network slice template;

the notification message further carries the identifier of the network slice template, an identifier of a service descriptor corresponding to the capability description information of the network slice, and the network slice management request message further carries the identifier of the network slice template and the identifier of the service descriptor; or the notification message further carries the identifier of the service descriptor corresponding to the capability description information of the network slice, and the network slice management request message further carries the identifier of the service descriptor.

With reference to the first aspect or any possible implementation of the first aspect, in a fourth possible implementation of the first aspect, before sending, by the network management unit, the capability description information of the network slice to the service management unit, the method further includes:

receiving, by the network management unit, a query request or a subscription request sent by the service management unit, where the query request is used to query a capability provided by the network management unit, and the subscription request is used to subscribe the capability provided by the network management unit.

With reference to the first aspect or any possible implementation of the first aspect, in a fifth possible implementation of the first aspect, the feature of the network slice includes any one of the following parameters:

a service type, a type of the network slice, a success rate of service invocation, a success rate of service usage, a service or network coverage level, a service or network coverage area, service or network latency, a throughput, mobility of a terminal device, a data size, reliability information, and a minimum user rate.

With reference to the first aspect or any possible implementation of the first aspect, in a sixth possible implementation of the first aspect, the deployment capability of the network slice includes at least one of the following pieces of information:

a service deployment area, a capacity, a service traffic model, an energy saving switch, latency, the mobility of the terminal device, the success rate of service invocation, the success rate of service usage, the minimum user rate, an affinity, an anti-affinity, a security level, and an isolation level.

A second aspect of this application provides a network management unit, including:

an obtaining unit, configured to obtain capability description information of a network slice, where the capability description information of the network slice includes at least one of a feature of the network slice and a deployment capability of the network slice; and a sending unit, configured to send a notification message to a service management unit, where the notification message carries the capability description information of the network slice.

For specific implementations of the network management unit, refer to the behavior function of the network management unit in the network slice management method according to the foregoing aspect or the possible implementations of the foregoing aspect. Details are not described herein again. Therefore, the network management unit provided in this aspect can achieve beneficial effects same as those achieved in the foregoing aspect.

According to another aspect, an embodiment of the present invention provides a network slice management apparatus. The apparatus is in a form of a chip product. The apparatus may implement a function performed by the network management unit in the foregoing method embodiments, and the function may be implemented by using hardware or may be implemented by hardware executing corresponding software. The hardware or software includes one or more modules corresponding to the foregoing functions.

In a possible design, a structure of the apparatus includes a processor and a transceiver. The processor is configured to support the network management apparatus in performing a corresponding function in the foregoing method. The transceiver is configured to support communication between the apparatus and another network element. The apparatus may further include a memory. The memory is configured to couple to the processor, and stores a necessary program instruction and necessary data of the network management apparatus.

According to still another aspect, an embodiment of the present invention provides a computer storage medium. The computer storage medium is configured to store a computer software instruction used by the network management unit, and the computer software instruction includes a program used to perform the network slice management method.

According to still another aspect, an embodiment of the present invention provides a computer program product. The program product stores a computer software instruction used by the network management unit, and the computer software instruction includes a program used to perform the network slice management method.

A third aspect of this application provides a network slice management method, including:

receiving, by a service management unit, a notification message from a network management unit, where the notification message carries capability description information of a network slice, the capability description information of the network slice is used to describe a capability of the network slice, and the capability description information of the network slice includes at least one of a feature of the network slice and a deployment capability of the network slice; and managing, by the service management unit, the network slice based on the capability description information of the network slice.

With reference to the third aspect, in a first possible implementation of the third aspect, the managing, by the service management unit, the network slice based on the capability description information of the network slice includes:

receiving, by the service management unit, a service request message, where the service request message includes service requirement information;

determining, by the service management unit, deployment information of the network slice based on the service requirement information and the capability description information of the network slice; and sending, by the service management unit, a network slice management request message to the network management unit, where the network slice management request message carries the deployment information of the network slice, and the deployment information of the network slice corresponds to the deployment capability of the network slice.

The capability description information of the network slice may be included in a network slice template, the notification message further carries an identifier of the network slice template, the identifier of the network slice template is used to identify the network slice template, and the network slice management request message further carries the identifier of the network slice template;

the capability description information of the network slice is included in the network slice template, the notification message further carries the identifier of the network slice template and an identifier of a service descriptor corresponding to the capability description information of the network slice, and the network slice management request message further carries the identifier of the network slice template and the identifier of the service descriptor; or the notification message further carries the identifier of the service descriptor corresponding to the capability description information of the network slice, and the network slice management request message further carries the identifier of the service descriptor.

With reference to the first possible implementation of the third aspect, in a second possible implementation of the third aspect, the service requirement information includes at least one of a service feature and a service deployment requirement.

With reference to the third aspect or any possible implementation of the third aspect, in a third possible implementation of the third aspect, before receiving, by the service management unit, the capability description information of the network slice from the network management unit, the method further includes:

sending, by the service management unit, a query request or a subscription request to the network management unit, where the query request is used to query a capability provided by the network management unit, and the subscription request is used to subscribe the capability provided by the network management unit.

With reference to the third aspect or any possible implementation of the third aspect, in a fourth possible implementation of the third aspect, the feature of the network slice includes any one of the following parameters:

a service type, a type of the network slice, a success rate of service invocation, a success rate of service usage, a service or network coverage level, a service or network coverage area, service or network latency, a throughput, mobility of a terminal device, a data size, reliability information, and a minimum user rate.

With reference to the third aspect or any possible implementation of the third aspect, in a fifth possible implementation of the third aspect, the deployment capability of the network slice includes at least one of the following pieces of information:

a service deployment area, a capacity, a service traffic model, an energy saving switch, latency, the mobility of the terminal device, the success rate of service invocation, the success rate of service usage, the minimum user rate, an affinity, an anti-affinity, a security level, and an isolation level.

A fourth aspect of this application provides a service management unit, including:

a receiving unit, configured to receive a notification message from a network management unit, where the notification message carries capability description information of a network slice, the capability description information of the network slice is used to describe a capability of the network slice, and the capability description information of the network slice includes at least one of a feature of the network slice and a deployment capability of the network slice; and a management unit, configured to manage the network slice by the service management unit based on the capability description information of the network slice.

For specific implementations of the service management unit, refer to the behavior function of the service management unit in the network slice management method according to the foregoing aspect or the possible implementations of the foregoing aspect. Details are not described herein again. Therefore, the service management unit provided in this aspect can achieve beneficial effects same as those achieved in the foregoing aspect.

According to another aspect, an embodiment of the present invention provides a network slice management apparatus. The network slice management apparatus is in a form of a chip product. The network slice management apparatus may implement a function performed by the service management unit in the foregoing method embodiments, and the function may be implemented by using hardware or may be implemented by hardware executing corresponding software. The hardware or software includes one or more modules corresponding to the foregoing functions.

In a possible design, a structure of the network slice management apparatus includes a processor and a transceiver. The processor is configured to support the network slice management apparatus in performing a corresponding function in the foregoing method. The transceiver is configured to support communication between the network slice management apparatus and another network element. The network slice management apparatus may further include a memory. The memory is configured to couple to the processor, and stores a necessary program instruction and necessary data of the network slice management apparatus.

According to still another aspect, an embodiment of the present invention provides a computer storage medium. The computer storage medium is configured to store a computer software instruction used by the service network management unit, and the computer software instruction includes a program used to perform the network slice management method.

According to still another aspect, an embodiment of the present invention provides a computer program product. The program product stores a computer software instruction used by the service network management unit, and the computer software instruction includes a program used to perform the network slice management method.

According to still another aspect, an embodiment of the present invention provides a computer program product. The program product stores a computer software instruction used by a second network management unit, and the computer software instruction includes a program used to perform the network slice management method.

A fifth aspect of this application provides a network component management method, including:

obtaining, by a first network management unit, capability description information of a network component, where the capability description information of the network component includes at least one of network service description information and a deployment capability of the network component, and the network component includes at least one network service; and sending, by the first network management unit, a notification message to a second network management unit, where the notification message includes the capability description information of the network component.

With reference to the fifth aspect, in a first possible implementation of the fifth aspect, the method further includes:

receiving, by the first network management unit, a network component management request message sent by the second network management unit, where the network component management request message carries network component requirement information; and deploying, by the first network management unit, the network component based on the network component requirement information.

With reference to the first possible implementation of the fifth aspect, in a second possible implementation of the fifth aspect, the network component requirement information includes deployment information of the network component; and the deploying, by the first network management unit, the network component based on the network component requirement information includes:

determining, by the first network management unit, a quantity of instances of the network service and deployment information of the network service based on the deployment information of the network component; and deploying, by the first network management unit, the network service based on the quantity of instances of the network service and the deployment information of the network service.

With reference to the fifth aspect or any possible implementation of the fifth aspect, in a third possible implementation of the fifth aspect, the obtaining, by a first network management unit, capability description information of a network component includes:

obtaining, by the first network management unit, a network component template, and obtaining the capability description information of the network component from the network component template, where the network component template includes the capability description information of the network component.

The notification message further carries an identifier of the network component template, and the network component management request message further carries the identifier of the network component template.

With reference to the fifth aspect or any possible implementation of the fifth aspect, in a fourth possible implementation of the fifth aspect, the network service description information includes at least one of the following pieces of information: a network service type, a network service feature, and a network service operation.

With reference to the fifth aspect or any possible implementation of the fifth aspect, in a fifth possible implementation of the fifth aspect, the deployment capability of the network component includes a deployment capability of the at least one network service.

With reference to the fifth aspect or any possible implementation of the fifth aspect, in a sixth possible implementation of the fifth aspect, the method further includes:

recording, by the first network management unit, an association relationship between the network component and the network service included in the network component.

A sixth aspect of this application provides a first network management unit, including:

an obtaining unit, configured to obtain capability description information of a network component, where the capability description information of the network component includes at least one of a network service description and a deployment capability of the network component, and the network component includes at least one network service; and a sending unit, configured to send a notification message to a second network management unit, where the notification message includes the capability description information of the network component.

For specific implementations of the first network management unit, refer to the behavior function of the first network management unit in the network component management method according to the foregoing aspect or the possible implementations of the foregoing aspect. Details are not described herein again. Therefore, the first network management unit provided in this aspect can achieve beneficial effects same as those achieved in the foregoing aspect.

According to another aspect, an embodiment of the present invention provides a network component management apparatus. The network component management apparatus is in a form of a chip product. The network component management apparatus may implement a function performed by the first network management unit in the foregoing method embodiments, and the function may be implemented by using hardware or may be implemented by hardware executing corresponding software. The hardware or software includes one or more modules corresponding to the foregoing functions.

In a possible design, a structure of the network component management apparatus includes a processor and a transceiver. The processor is configured to support the network component management apparatus in performing a corresponding function in the foregoing method. The transceiver is configured to support communication between the network component management apparatus and another network element. The network component management apparatus may further include a memory. The memory is configured to couple to the processor, and stores a necessary program instruction and necessary data of the network component management apparatus.

According to still another aspect, an embodiment of the present invention provides a computer storage medium. The computer storage medium is configured to store a computer software instruction used by the first network management unit, and the computer software instruction includes a program used to perform the network component management method.

According to still another aspect, an embodiment of the present invention provides a computer program product. The program product stores a computer software instruction used by the first network management unit, and the computer software instruction includes a program used to perform the network component management method.

A seventh aspect of this application provides a network component management method, including:

obtaining, by a second network management unit, capability description information of a network component, where the capability description information of the network component includes at least one of network service description information of the network component and a deployment capability of the network component, and the network component includes at least one network service; and managing, by the second network management unit, the network component based on the capability description information of the network component.

With reference to the seventh aspect, in a first possible implementation of the seventh aspect, the managing, by the second network management unit, the network component based on the capability description information of the network component includes:
  receiving, by the second network management unit, a network management request message, where the network management request message carries network requirement information;
  determining, by the second network management unit, network component requirement information based on the capability description information of the network component and the network requirement information; and
  sending, by the second network management unit, a network component management request message to a first network management unit, where the network component management request message carries the network component requirement information.

With reference to the first possible implementation of the seventh aspect, in a second possible implementation of the seventh aspect, the network component requirement information includes deployment information of the network component, and the deployment information of the network component corresponds to a deployment capability of a network slice.

With reference to the seventh aspect or any possible implementation of the seventh aspect, in a third possible implementation of the seventh aspect, the managing, by the second network management unit, the network component based on the capability description information of the network component includes:
  generating, by the second network management unit, a network slice template based on the capability description information of the network component, where a network slice corresponding to the network slice template includes at least one network component.

With reference to the third possible implementation of the seventh aspect, in a fourth possible implementation of the seventh aspect, the network slice template further includes network service description information of the network component.

With reference to the seventh aspect or any possible implementation of the seventh aspect, in a fifth possible implementation of the seventh aspect, the obtaining, by a second network management unit, capability description information of a network component includes:
  receiving, by the second network management unit, a notification message from the first network management unit, where the notification message includes the capability description information of the network component; or
  obtaining, by the second network management unit, a network component template, where the network component template includes the capability description information of the network component.

With reference to the seventh aspect or any possible implementation of the seventh aspect, in a sixth possible implementation of the seventh aspect, the network service description information includes at least one of the following pieces of information: a network service type, a network service feature, and a network service operation.

With reference to the seventh aspect or any possible implementation of the seventh aspect, in a seventh possible implementation of the seventh aspect, the deployment capability of the network component includes a deployment capability of the at least one network service.

With reference to the seventh aspect or any possible implementation of the seventh aspect, in an eighth possible implementation of the seventh aspect, the capability description information of the network component is included in the network component template, and the method further includes:
  generating, by the second network management unit, a network template based on the network component template, where the network template includes network service link description information, and the network service link description information is used to describe an association relationship between different network services.

With reference to the eighth possible implementation of the seventh aspect, in a ninth possible implementation of the seventh aspect, the network service link description information includes source service description information, destination service description information, and link requirement information.

An eighth aspect of this application provides a second network management unit, including:
  an obtaining unit, configured to obtain capability description information of a network component, where the capability description information of the network component includes at least one of a network service description of the network component and a deployment capability of the network component, and the network component includes at least one network service; and
  a management unit, configured to manage the network component based on the capability description information of the network component.

For specific implementations of the second network management unit, refer to the behavior function of the second network management unit in the network component management method according to the foregoing aspect or the possible implementations of the foregoing aspect. Details are not described herein again. Therefore, the second network management unit provided in this aspect can achieve beneficial effects same as those achieved in the foregoing aspect.

According to another aspect, an embodiment of the present invention provides a network component management apparatus. The network component management apparatus is in a form of a chip product. The network component management apparatus may implement a function performed by the second network component management unit in the foregoing method embodiments, and the function may be implemented by using hardware or may be implemented by hardware executing corresponding software. The hardware or software includes one or more modules corresponding to the foregoing function.

In a possible design, a structure of the network component management apparatus includes a processor and a transceiver. The processor is configured to support the network component management apparatus in performing a corresponding function in the foregoing method. The transceiver is configured to support communication between the network component management apparatus and another network element. The network component management apparatus may further include a memory. The memory is configured to couple to the processor, and store a necessary program instruction and necessary data of the network component management apparatus.

According to still another aspect, an embodiment of the present invention provides a computer storage medium. The computer storage medium is configured to store a computer software instruction used by the second network management unit, and the computer software instruction includes a program used to perform the network component management method.

According to still another aspect, an embodiment of the present invention provides a network component management system, including the first network management unit according to the sixth aspect and the second network management unit according to the eighth aspect.

DESCRIPTION OF EMBODIMENTS

Figure 1:
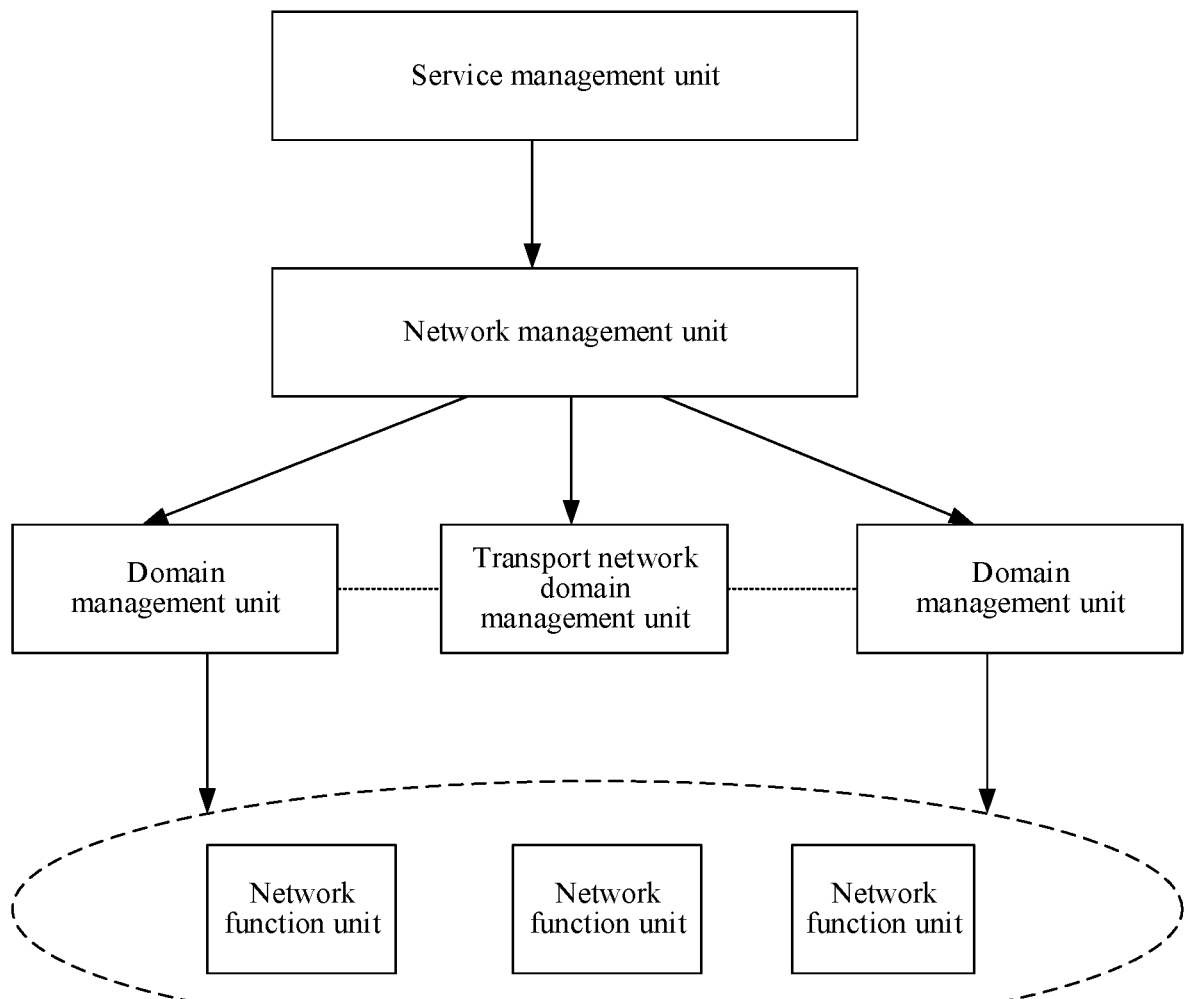
FIG. 1 is a simplified schematic diagram of a system architecture according to this application.

Some terms in this application are first explained and described.

A network slice, also referred to as a network slice instance, is a combination of network function (NF) units and resources ensuring that a bearer service can meet a service level agreement (SLA) requirement. The NFs and the resources may perform hard isolation (for example, physical isolation) or soft isolation (for example, logical isolation) based on different requirements. Each network slice is logically independent. The network slice may include at least a core network (CN) part, an access network (AN) part, and a transport network (TN) part. Alternatively, the network slice may include any one or two parts of a CN part, an AN part, or a TN part.

In this application, the network slice is a wide concept, may be considered as a traditional network, a dedicated network, or a network slice, and it may also be considered that a network slice subnet is also a network slice.

Network component is a combination of network functions and resources ensuring that the bearer service can meet the SLA requirement. Generally, the network component may be segmented by the network slice, and may be the network slice subnet or the network function.

A network service is a service provided by the network component or the network slice to the outside. The service may be a network function on the network component or the network slice, for example, an access and mobility management function (AMF), a unified data management (UDM), a policy control function (PCF), an NEF service function, an NRF service function, a session management function (SMF), an SMSF service function, an authentication server function (AUSF), a network data analysis function (NWDAF) function, a 5G gNB central unit (gNB CU) function, a 5G gNB distribution unit (gNB DU) function, a 5G gNB low latency service (gNBURLLC service) function, a 5G gNB mobile broadband service (gNBeMBB service) function, and a 5G gNB mass Internet of Things (gNBmIoTservice) function.

The foregoing description shows one type of granularity. The network service may alternatively be a thinner granularity. As shown in Table 1, the AMF service may include an amf Communication service and a Namf EventExposure service. The UDM service may include a subscriber data management service and a terminal device context management service. The 5G-EIR service may include an N5g-eir_ME Identity Check service. The PCF service may include an Npcf_PolicyControl service, an Npcf Event Notification service, and an Npcf_Policy Authorization service. The NEF service may include a device trigger service. The NRF service may include an Nnrf_NF Discovery service. The SMF service may include an Nsmf_PDUSession service and an Nsmf_EventExposure service. The SMSF service may include an Nsmsf_SMService service. The AUSF service may include a Nausf_UE Authentication service. The NWDA service may include N23_Subscribe services.

TABLE 1

| | |
|---|---|
| AMF service | Namf_Communication service |
| | Namf_EventExposure service |
| UDM service | Subscriber Data Management service |
| | UE context management service |
| PCF service | Npcf_PolicyControl service |
| | Npcf Event Notification service |
| | Npcf_Policy Authorization service |
| NEF service | Device Trigger service |
| NRF service | Nnrf_NF Discovery service |
| SMF service | Nsmf_PDUSession service |
| | Nsmf_EventExposure service |
| SMSF service | Nsmsf_SMService service |
| AUSF service | Nausf_UE Authentication service |
| NWDA service | N23_Subscribe services |
| gNBURLLC service | |
| gNBeMBB service | |
| gNBmIoTservice | |

A network service endpoint is an endpoint at which the network component or the network slice provides a service (for example, the network service) to the outside. A network component or network slice includes at least one network service endpoint, and each network service endpoint may provide one or more services to the outside.

The following describes implementations of this application in detail with reference to accompanying drawings.

The network slice management method provided in this application may be implemented by a functional unit in a network architecture shown in FIG. 1. The network architecture may be deployed in a 5G system. As shown in FIG. 1, the network architecture may include a service management unit, a network management unit, a component management unit, a transport network domain management unit (TN-DM), and a network function unit (NF). The component management unit may transmit data or signaling messages through the TN-DM, and the network slice or the network slice subnet may include a plurality of NFs.

The service management unit in FIG. 1 may be a service management function (SMF) unit. The service management unit is mainly configured to receive a service requirement of a tenant, convert the service requirement into a network slice requirement, and manage the service. The service management unit may be deployed in an operation support system (OSS), or may be deployed outside the OSS. The service management unit may be a management or operation system of a third party (for example, the tenant). The service management unit may be deployed independently, or may be integrated in a management unit (for example, a business support system (BSS), a service management unit, a service orchestration unit, or a service management and orchestration unit). It should be noted that the service management unit in FIG. 1 may be named as the SMF unit, and may further be named as a client service management function unit or a communication service management function (CSMF) unit.

The network management unit in FIG. 1 may be a network management, (NM) unit, mainly includes one or both of an end-to-end network management function or an end-to-end network orchestration function, and may include some or all of the following functions: an end-to-end network management (for example, network life cycle management, network template management, network fault management, network performance management, and network configuration management), mapping between an end-to-end network, a subnet and a network function, coordination of network resources or sub-SLAs provided by different domains (for example, an access network domain, a core network domain, or a transport domain), decomposition of network requirement information into subnet requirement information, and unified orchestration of subnets and network functions that are provided by each child domain, so that the subnets or the network functions that are provided by the different child domains can satisfy a requirement (for example, the SLA requirement, a requirement on a key performance indicator (KPI), and a requirement on quality of service (QoS)) of a target service or network. The network management unit may be deployed inside or outside the OSS. The network management unit may be deployed independently, or may be integrated in a management unit, for example, a network orchestration unit, a network management and orchestration unit, a service management unit, a service orchestration unit, a service management and orchestration unit, or a network functions virtualization orchestrator (NFVO). It should be noted that the network management unit in FIG. 1 can be named as the NM, and may further be named as a cross-domain management unit, a cross-domain network slice management unit, a network slice management function (NSMF) unit, or the like.

The component management unit in FIG. 1 may be a domain management (DM) unit, includes one or both of a subnet management function or an orchestration function, and may include some or all of the following functions: domain management (including subnet life cycle management (creation, updating, and deleting), subnet fault management, subnet performance management, subnet configuration management, and the like), service management (including service life cycle management, service fault management, service performance management, service configuration management, and the like), and coordination of network resources, for example, the NF units and network elements (NE), to perform unified orchestration. The component management unit may be deployed inside or outside the OSS. The component management unit may be deployed independently, or may be integrated in a management unit (for example, the network management unit, the network orchestration unit, the network management and orchestration unit, a network element management unit, the network function management unit, the service management unit, the service orchestration unit, the service management and orchestration unit, or the NFVO). It should be noted that the component management unit in FIG. 1 can be named as the DM unit, and may further be named as a domain slice management unit, a network slice subnet management unit, or the like.

Specifically, a subnet managed by the component management unit may include one or more of the following parts: an AN part, a CN part, and a TN part. When the subnet managed by the component management unit includes only the AN part, it may be considered that the subnet management unit is an AN DM. When the subnet managed by the component management unit includes only the CN part, it may be considered that the subnet management unit is a CN DM. When the subnet managed by the component management unit includes the AN part and the CN part, it may be considered that the subnet management unit is a Mix DM.

The TN-DM in FIG. 1 includes one or both of a transport network management function or a transport network orchestration function, and may include some or all of the following functions: management of a transport network part (including life cycle management (creation, updating, and deleting) of the transport network part, fault management of the transport network part, performance management of the transport network part, configuration management of the transport network part, and the like). The TN-DM may be deployed inside or outside the OSS. The TN-DM may be deployed independently, or may be integrated in a management unit (for example, the network management unit, the network orchestration unit, the network management and orchestration unit, the component management unit, the network element management unit, the service management unit, the service orchestration unit, the service management and orchestration unit, or the NFVO). It should be noted that the TN-DM is not limited to the name shown in FIG. 1, and may further be named as a (transport network) subnet management unit, a network slice transport network management unit, or the like.

It should be noted that FIG. 1 is merely an architecture diagram used as an example. The network architecture may further include another function node other than a function node shown in FIG. 1. For example, the network architecture further includes a network function manager (NF) unit other than the management unit shown in FIG. 1. The NF manager unit includes one or all of the following functions: network function life cycle management, network function fault management, network function performance management, network function configuration management, and the like. The name of the NF manager is not limited in this application, and the name of the NF manager may also be a network element manager (EM). The NF manager may be deployed in the component management unit. To be specific, the component management unit includes a function of the NF manager, and the NF manager may also be deployed independently with the component management unit. A network function management interface exists between the NF manager and the component management unit.

Figure 2:
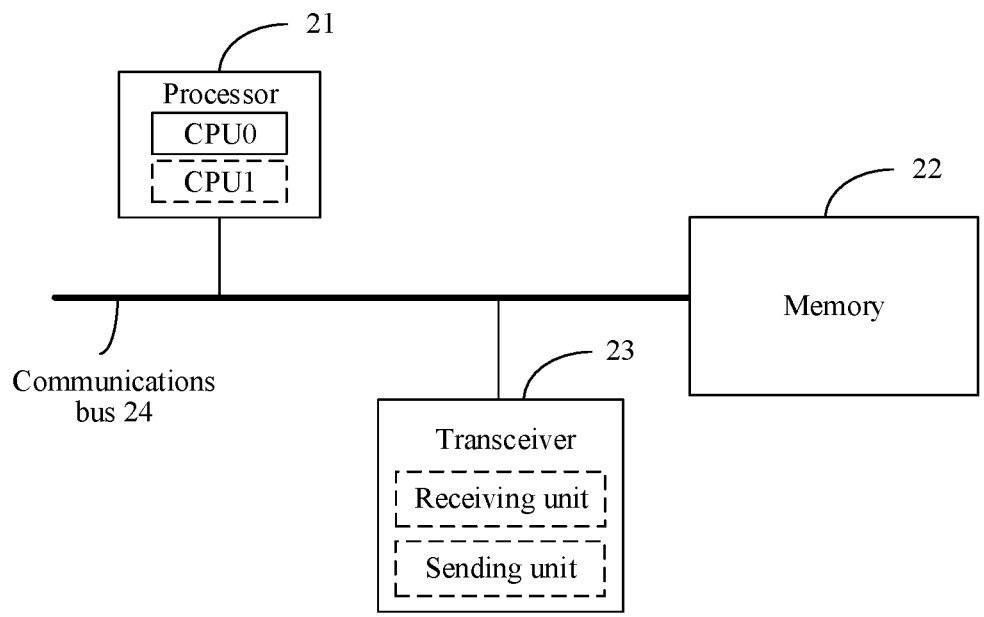
FIG. 2 is a schematic composition diagram of a network slice management apparatus according to this application.

FIG. 2 is a network slice management apparatus according to this application. The apparatus may be the network management unit in FIG. 1, and the apparatus may include at least one processor 21, a memory 22, a transceiver 23, and a communications bus 24. It should be noted that the network slice management apparatus shown in FIG. 2 constitutes no limitation on the apparatus, and may include more or fewer components than those shown in the figure, or some components may be combined, or a different component deployment may be used. This is not limited in this application. The following specifically describes the components of the management unit with reference to FIG. 2.

The processor 21 is a control center of the network slice management apparatus, may be a processor, and may also be a collective name of a plurality of processing elements. For example, the processor 21 is a central processing unit (CPU), or an application-specific integrated circuit (ASIC), or may be configured to one or more integrated circuits implementing this application, for example, one or more microprocessors (DSP) or one or more field programmable gate arrays (FPGA). The processor 21 may perform various functions of the network slice management apparatus by running or executing a software program stored in the memory 22 and invoking data stored in the memory 22.

The memory 22 may be a read-only memory (ROM) or another type of static storage device that can store static information and a static instruction, or a random access memory (RAM) or another type of dynamic storage device that can store information and an instruction, or an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 22 may exist independently, and connect to the processor 21 using the communications bus 24. The memory 22 may alternatively be integrated with the processor 21. The memory 22 is configured to store a software program for carrying out the solutions provided in this application, and the processor 21 controls execution.

The transceiver 23 is configured to communicate with another device or a communications network such as an Ethernet, a radio access network (RAN), or a wireless local area network (WLAN). The transceiver 23 may include a receiving unit to implement a receiving function and a sending unit to implement a sending function.

The communications bus 24 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 2, but this does not mean that there is only one bus or only one type of bus.

The processor 21 is configured to obtain capability description information of a network slice, where the capability description information of the network slice includes at least one of a feature of the network slice and a deployment capability of the network slice.

The transceiver 23 is configured to send a notification message to a service management unit, where the notification message carries the capability description information of the network slice.

In another embodiment of this application, the transceiver 23 is further configured to receive a network slice management request message sent by the service management unit, where the network slice management request message carries the deployment information of the network slice, and the deployment information of the network slice corresponds to the deployment capability of the network slice; and the processor 21 is further configured to manage the network slice based on the deployment information of the network slice.

In another embodiment of this application, the processor 21 is configured to determine deployment information of a network component based on the deployment information of the network slice, where the network slice includes at least one network component; and send the deployment information of the network component to a component management unit through the transceiver, where the deployment information of the network component is used to deploy the network component.

In another embodiment of this application, the processor 21 is configured to obtain a network slice template, and obtain the capability description information of the network slice from the network slice template, where the network slice template includes the capability description information of the network slice.

In another embodiment of this application, the processor 21 is further configured to, before the transceiver 23 sends the capability description information of the network slice to the service management unit, receive a query request or a subscription request sent by the service management unit through the transceiver 23, where the query request is used to query a capability provided by the network management unit, and the subscription request is used to subscribe the capability provided by the network management unit.

In another embodiment of this application, the memory 22 is configured to store a computer program instruction and data, the processor 21 invokes the computer program instruction and the data to perform corresponding functions, and trigger the transceiver 23 to perform corresponding functions. Details are not described herein again.

The foregoing embodiments merely briefly describe the functions of the processor 21, the memory 22, and the transceiver 23. For specific working procedures and functions of the processor 21, the memory 22, and the transceiver 23, refer to related content described in method embodiments corresponding to FIG. 4 and FIG. 5. For example, a processing process of the network management unit described in the following method embodiments is performed by the processor 21, a storing process of the network management unit is performed by the memory 22, and a receiving process and a sending process of the network management unit are performed by the transceiver 23.

Another embodiment of this application provides a computer storage medium. The computer storage medium is configured to store a computer software instruction used by the network slice management apparatus, and the computer software instruction includes a program used to perform solutions described in FIG. 4 and FIG. 5.

Figure 3:
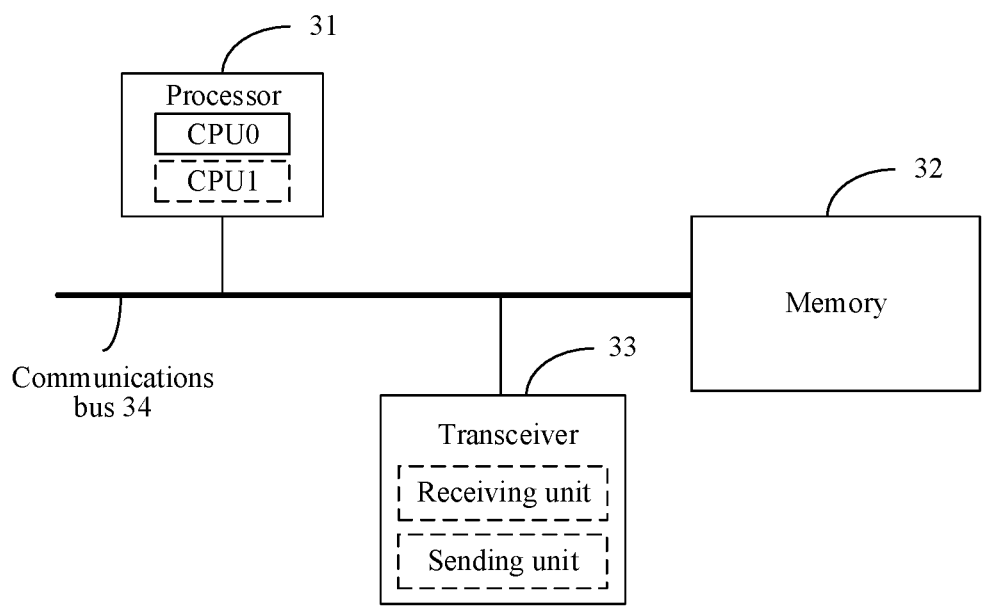
FIG. 3 is a schematic composition diagram of a network slice management apparatus according to this application.

FIG. 3 is a network slice management apparatus according to this application. The apparatus may be the service management apparatus in FIG. 1, and the apparatus may include at least one processor 31, a memory 32, a transceiver 33, and a communications bus 34. It should be noted that the network slice management apparatus shown in FIG. 3 constitutes no limitation on the apparatus, and may include more or fewer components than those shown in the figure, or some components may be combined, or a different component deployment may be used. This is not limited in this application. The following specifically describes the components of the management unit with reference to FIG. 3.

The processor 31 is a control center of the network slice management apparatus, may be a processor, and may also be a collective name of a plurality of processing elements. For example, the processor 31 is a CPU, an ASIC, or one or more integrated circuits configured to implement this application, for example, one or more DSPs or one or more FPGAs. The processor 31 may perform various functions of the network slice management apparatus by running or executing a software program stored in the memory 32 and invoking data stored in the memory 32.

The memory 32 may be a ROM or another type of static storage device that can store static information and a static instruction, a RAM or another type of dynamic storage device that can store information and an instruction; or may be an EEPROM, a CD-ROM or another compact-disc storage, optical disc storage (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 32 may exist independently, and connect to the processor 31 by using the communications bus 34. The memory 32 may alternatively be integrated with the processor 31. The memory 32 is configured to store a software program for executing the solutions described in this application, and the processor 31 controls execution.

The transceiver 33 is configured to communicate with another device or a communications network such as an Ethernet, a RAN, or a WLAN. The transceiver 33 may include a receiving unit to implement a receiving function and a sending unit to implement a sending function.

The communications bus 34 may be an ISA bus, a PCI bus, an EISA bus, or the like. The bus may be classified into an address bus, a data bus, a control bus, and the like. For ease of representation, only one thick line is used to represent the bus in FIG. 3, but this does not mean that there is only one bus or only one type of bus.

The transceiver 33 is configured to receive a notification message from a network management unit, where the notification message carries capability description information of a network slice. The capability description information of the network slice is used to describe a capability of the network slice, and the capability description information of the network slice includes at least one of a feature of the network slice and a deployment capability of the network slice. The processor 31 is configured to manage the network slice based on the capability description information of the network slice.

In another embodiment of this application, the processor 31 is configured to: receive a service request message through the transceiver, where the service request message includes service requirement information;
  determine deployment information of the network slice based on the service requirement information and the capability description information of the network slice; and
  send a network slice management request message to the network management unit through the transceiver, where the network slice management request message carries the deployment information of the network slice, and the deployment information of the network slice corresponds to the deployment capability of the network slice.

In another embodiment of this application, the processor 31 is further configured to, before the transceiver receives the capability description information of the network slice from the network management unit, send a query request or a subscription request to the network management unit through the transceiver, where the query request is used to query a capability provided by the network management unit, and the subscription request is used to subscribe the capability provided by the network management unit.

In another embodiment of this application, the memory 32 is configured to store a computer program instruction and data. The processor 31 invokes the computer program instruction and the data to perform corresponding functions, and triggers the transceiver 33 to perform corresponding functions. Details are not described herein again.

The foregoing embodiments merely briefly describe the functions of the processor 31, the memory 32, and the transceiver 33. For specific working procedures and functions of the processor 31, the memory 32, and the transceiver 33, refer to related content described in method embodiments corresponding to FIG. 4 and FIG. 5. For example, a processing process of the service management unit described in the following method embodiments is performed by the processor 31, a storing process of the service management unit is performed by the memory 32, and a receiving process and a sending process of the service management unit are performed by the transceiver 33.

Another embodiment of this application provides a computer storage medium. The computer storage medium is configured to store a computer software instruction used by the network slice management apparatus, and the computer software instruction includes a program used to perform described in FIG. 4 and FIG. 5.

The following describes the network slice management method provided in this application in detail with reference to the communications system shown in FIG. 1. Devices in the following method embodiments may correspondingly include the components shown in FIG. 2 and FIG. 3. It should be noted that although an order is shown in the method flowchart, in some cases, shown or described steps may be performed in an order different from the order shown herein.

Figure 4:
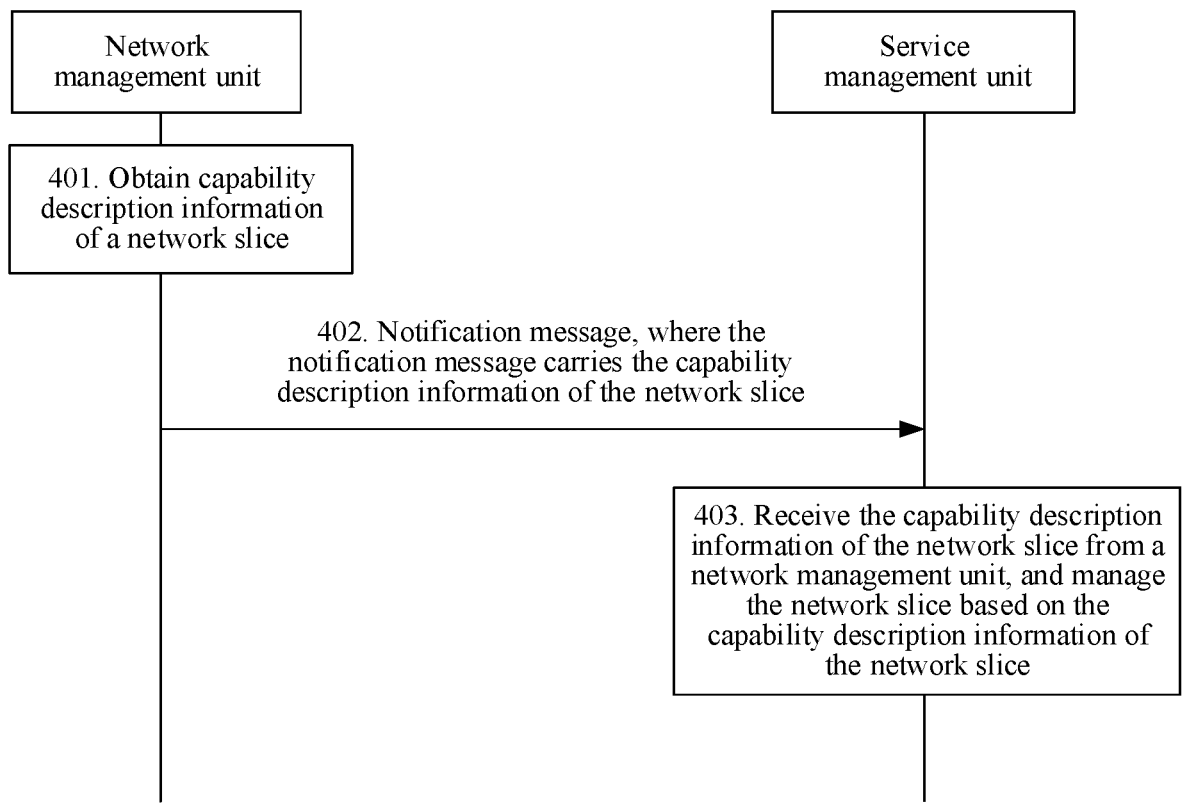
FIG. 4 is a flowchart of a network slice management method according to this application.

FIG. 4 is a flowchart of a network slice management method according to this application. As shown in FIG. 4, the method may include the following steps.

Step 401. A network management unit obtains capability description information of a network slice.

The network management unit may be the network management unit in FIG. 1. The network management unit may deploy a plurality of network slices. It should be noted that in the embodiments of this application, the term "deploy" may further be replaced by create, instantiate, or configure. This is not limited herein.

The capability description information of the network slice may provide a basis for deploying the network slice by the network management unit. The capability description information of the network slice may be used to describe related information of the network slice deployed by the network management unit. For example, the capability description information of the network slice may include a feature of the network slice, a deployment capability of the network slice, or the feature of the network slice and the deployment capability of the network slice.

The feature of the network slice may also be referred to as communication service description information. The feature of the network slice may be used to describe a feature of a service carried by the network slice deployed by the network management unit. For the features of the network slice, refer to the following related descriptions. Details are not described herein again.

The deployment capability of the network slice may also be referred to as a communication service specific parameter descriptor (CSSPD). The deployment capability of the network slice may be used to describe a capacity carried by the network slice deployed by the network management unit, a deployment area scope, a function that can be supported by the network slice, and the like. Specifically, for the deployment capability of the network slice, refer to the following related descriptions. Details are not described herein again.

The capability description information of the network slice may exist independently, or may be included in a network slice template. When the capability description information of the network slice is included in the network slice template, step 401 may be replaced by that the network management unit obtains the network slice template. The network slice template includes the capability description information of the network slice.

The network slice template may correspond to an identifier of a network slice template. The identifier of the network slice template may be used to identify the network slice template. The capability description information of each network slice in the network slice template may correspond to an identifier of a service descriptor. The identifier of the service descriptor may be used to identify the capability description information of the network slice in the network slice template, and the identifier of the network slice template and the identifier of the service descriptor may be allocated by the network management unit.

Optionally, the identifier of the network slice template may be a number, a letter, or another identifier (for example, the identifier of the network slice template may be a combination of one or more of the following information: a name of the network slice template, a provider, a version number, and the like). This is not limited herein. For example, a number 1 may be used to identify a network slice template 1. The identifier of the service descriptor may be a number, a letter, or another identifier. This is not limited herein. For example, a letter A may be used to identify capability description information (for example, capability description information 1) of a network slice 1 in the network slice template 1. It should be noted that identifiers that are of the network slice templates and that correspond to different network slice templates are different, identifiers of the service descriptor corresponding to the capability description information of different network slices in a same network slice template are different, and the identifiers of the service descriptor corresponding to the capability description information of the network slices in the different network slice templates may be the same as or different from each other. For example, an identifier of the service descriptor corresponding to the capability description information of a network slice in the network slice template 1 is 1, and an identifier of the service descriptor corresponding to capability description information of a network slice in a network slice template 2 may also be 1. It should be noted that when the network slice template includes capability description information of only one network slice, the identifier of the network slice template may be to the same as the identifier of the service descriptor corresponding to the capability description information of the network slice. To be specific, both the identifier of the network slice template and the identifier of the service descriptor may be used to identify the network slice template.

Optionally, the network management unit may obtain the capability description information of the network slice by using any one of the following manners.

Manner 1. The network management unit obtains the capability description information of the network slice from a network slice provider.

Manner 2. The network management unit obtains the network slice template from the network slice provider, and obtains the capability description information of the network slice from the network slice template, where the network slice template includes the capability description information of the network slice.

The network slice provider in Manner 1 and Manner 2 may be a network slice designer or a network slice template provider, for example, may be an operator or a device vendor.

Manner 3. The capability description information of the network slice is stored in a database, the network management unit accesses the database, and obtains the capability description information of the network slice from the database.

Manner 4. The network slice template is stored in the database in advance, the network management unit accesses the database, obtains the network slice template from the database, and obtains the capability description information of the network slice from the network slice template, where the network slice template includes the capability description information of the network slice.

The database in Manner 3 and Manner 4 may be a database independent from the network management unit.

Optionally, in Manner 1 or Manner 3, after obtaining the capability description information of the network slice, the network management unit may further store the received capability description information of the network slice locally or in a database accessible by the network management unit, and allocates the identifier of the service descriptor to the capability description information of each network slice; and in Manner 2 and Manner 4, after obtaining the network slice template, the network management unit may store the network slice template locally or in a database accessible by the network management unit, allocate an identifier of the network slice template for each network slice template, and allocate the identifier of the service descriptor for the network slice template including the capability description information of the network slice. Alternatively, the network slice template obtained by the network management unit further includes the identifier of the service descriptor corresponding to the capability description information of the network slice. After obtaining the network slice template, the network management unit allocates the identifier of the network slice template only to the obtained network slice template.

Step 402. The network management unit sends a notification message to a service management unit, where the notification message carries the capability description information of the network slice.

The service management unit may be the service management unit in FIG. 1.

The notification message may be used to notify the service management unit of a capability provided by the network management unit, for example, a network slice that may be deployed by the network management unit, and the notification message may provide a basis for selecting, by the service management unit, a network slice satisfying a service requirement of the service management unit.

Optionally, the network management unit may send the notification message to the service management unit through a communications interface between the network management unit and the service management unit. The communications interface may be a life cycle management interface, a subscription interface, a notification interface, a configuration interface, a performance management interface, a fault management interface, and the like.

Step 403. The service management unit receives the capability description information of the network slice from the network management unit, and manages the network slice based on the capability description information of the network slice.

The service management unit may receive the capability description information of the network slice from the notification message.

Optionally, that the service management unit manages the network slice based on the capability description information of the network slice includes:
  receiving, by the service management unit, a service request message, where the service request message includes service requirement information;
  determining, by the service management unit, deployment information of the network slice based on the service requirement information and the capability description information of the network slice; and
  sending, by the service management unit, a network slice management request message to the network management unit, where the network slice management request message carries the deployment information of the network slice, and the deployment information of the network slice corresponds to a deployment capability of the network slice, so that the network management unit manages the network slice based on the deployment information of the network slice.

The service management unit may receive the service request message from a tenant. The tenant may be a user, for example, a factory, a school, and the like using the service provided by the network slice.

The service requirement information may be used to describe a service requirement of the tenant, and the service requirement information may include a feature of the service requested by the tenant, a service deployment requirement, or the feature of the service requested by the tenant and the service deployment requirement. The service requested by the tenant may be a type of service executed by a terminal device corresponding to the tenant. For example, the terminal device is a power meter recording a quantity of electricity used by the tenant, and the service requested by the tenant may be a service of reading the power meter.

The feature of the service requested by the tenant may include at least one of the following: a service type, a success rate of service invocation, a success rate of service usage, a service or network coverage area, service or network latency, a throughput, mobility of the terminal device, a data size, reliability information, a minimum user rate, and the like. The service type may be used to indicate a type to which the service requested by the tenant belongs. The success rate of service invocation may indicate a probability in which the service requested by the tenant is successfully invoked by another network service. The success rate of service usage may indicate a probability in which the service requested by the tenant is successfully executed. The service or network coverage area may indicate a coverage situation of the service requested by the tenant or a coverage situation of a network requested by the tenant. The coverage may be strong coverage, common coverage, weak coverage, and the like. The service or network latency may indicate transmission duration of the service requested by the tenant or transmission duration of the network requested by the service. The mobility of the terminal device may indicate a moving situation of a device using the service requested by the tenant, and includes whether the terminal device is moving, a quantity of terminal devices in a moving state, a moving degree of the terminal device, and the like. The data size may indicate a size of a packet supported by the service requested by the tenant. The reliability information may indicate a degree of a capability or continuous operation of the service provided by the network slice. The minimum user rate may indicate a quantity of data transmission of the service user or a terminal using the service.

The service deployment requirement may include at least one of the following: a service deployment area, a capacity, a service traffic model, an energy saving switch, latency, the mobility of the terminal device, the success rate of service invocation, the success rate of service usage, the minimum user rate, an affinity, an anti-affinity, a security level, an isolation level, and the like. The service deployment area may indicate a coverage area of the service requested by the tenant; the capacity may indicate a maximum quantity of users using the service requested by the tenant. The service traffic model may indicate traffic information of the service requested by the tenant, including a quantity of terminal devices, a territory distribution of the terminal device, a service transmission situation of the terminal device, an activation ratio of the terminal device, usage time of the service, a coverage area of the service, a moving condition of the terminal device, a roaming condition of the terminal device, and the like. The energy saving switch may indicate indication information used to describe whether to enable an energy saving function of a network device.

The terminal device in this application may be a device that can obtain or use a service of the tenant. The terminal device corresponds to the tenant. For example, the terminal device may be a device such as the power meter recording the quantity of electricity used by the tenant.

Optionally, that the service management unit determines the deployment information of the network slice based on the service requirement information and the capability description information of the network slice includes:
  determining, by the service management unit based on the service requirement information, the feature of the service requested by the tenant and service deployment requirement;
  querying, by the service management unit, the capability description information of the network slice sent by the network management unit, and selecting the capability description information of the network slice in which a feature of the network slice satisfies the feature of the service and the deployment capability of the network slice satisfies the service deployment requirement; and
  obtaining, by the service management unit, the deployment information of the network slice based on the service deployment requirement.

It should be noted that in this application, if the service management unit selects the capability description information of the network slice in which the feature of the network slice satisfies the feature of the service and the deployment capability of the network slice satisfies the service deployment requirement, it indicates that the network management unit can deploy the network slice satisfying the service requirement of the tenant, that is, the network management unit can provide a service to the tenant. If the service management unit cannot select the capability description information of the network slice in which the feature of the network slice satisfies the feature of the service and the deployment capability of the network slice satisfies the service deployment requirement, it indicates that the network management unit does not support a function of deploying the network slice satisfying the service requirement of the tenant, that is, the network management unit does not have the capability of providing the service to the tenant.

That the feature of the network slice satisfies the feature of the service may indicate that the feature of the network slice is the same as the feature of the service, and that the deployment capability of the network slice satisfies the service deployment requirement may indicate that the deployment capability of the network slice is the same as the service deployment requirement or the deployment capability of the network slice is greater than the service deployment requirement. It should be noted that when the capability description information of the network slice includes only the feature of the network slice, the deployment capability of the network slice may be a default value, and may also be obtained based on the feature of the network slice. When the capability description information of the network slice includes only the deployment capability of the network slice, the feature of the network slice may be obtained based on the deployment capability of the network slice, so that the service management unit performs one-to-one matching with the feature of the service and the service deployment requirement based on the feature of the network slice and the deployment capability information of the network slice, and selects the capability description information of the network slice in which the feature of the network slice satisfies the feature of the service and the deployment capability of the network slice satisfies the service deployment requirement.

The deployment information of the network slice corresponds to the deployment capability of the network slice, and that the service management unit obtains the deployment information of the network slice based on the service deployment requirement may include that the service management unit directly uses the service deployment requirement as the deployment information of the network slice.

For example, the service deployment requirement is that a capacity is one million, a deployment area is an area 1, and the like. The deployment capability of the network slice is that the capacity is 500,000 to 1.5 million, and the deployment area is the area 1 and an area 2. In this case, the deployment capability of the network slice is greater than the service deployment requirement. To be specific, if the service deployment requirement is satisfied, the service deployment requirement may directly be used as the deployment information of the network slice: The capacity is one million, and the deployment area is Shanghai Pudong area.

Compared with the prior art, in the solution shown in FIG. 4, the network management unit obtains the capability description information of the network slice, and sends the capability description information of the network slice to the service management unit, so that the service management unit manages the network slice based on the capability description information of the network slice. To be specific, a capability that can be provided by the network management unit is sent to the service management unit in advance, so that the service management unit automatically manages the network slice based on the capability of the network management unit, avoiding a manually negotiated network planning process, improving network slice management efficiency, and shortening a service online time.

In the solution shown in FIG. 4, the feature of the network slice may include any one of the following:

a service type, a type of the network slice, a success rate of service invocation, a success rate of service usage, a service or network coverage level, a service or network coverage area, service or network latency, a throughput, mobility of a terminal device, a data size, reliability information, and a minimum user rate.

In the solution shown in FIG. 4, the deployment capability of the network slice may include at least one of the following:

a service deployment area, a capacity, a service traffic model, an energy saving switch, latency, the mobility of the terminal device, the success rate of service invocation, the success rate of service usage, the minimum user rate, an affinity, an anti-affinity, a security level, and an isolation level.

The service deployment area may be used to indicate a location at which the network slice is deployed.

The affinity of the network slice means that the network slice and another network slice have an affinity when the network slice and the other network slice can be deployed in a same location area. The anti-affinity of the network slice means that the network slice and another network slice have an anti-affinity when the network slice and the other network slice cannot be deployed in the same location area.

The service traffic model may include at least one of the following: a quantity of terminal devices, a territory distribution of the terminal device, a service transmission situation of the terminal device, an activation ratio of the terminal device, usage time of the service, a coverage area of the service, a moving condition of the terminal device, and a roaming condition of the terminal device.

The quantity of terminal devices may indicate a quantity of devices that can obtain or use a service of the tenant.

The territory distribution of the terminal device may indicate an area deployment situation of a device that can obtain or use a service of the tenant. The quantity of terminal devices and the territory distribution situation of the terminal device may be combined as a piece of information in service traffic information of the network slice. For example, a quantity of terminal devices in the area 1 is 100, and a quantity of terminal devices in the area 2 is 200.

The service transmission situation of the terminal device may indicate a situation in which the terminal device uses the service, for example, a time period during which the terminal device sends and receives the service, a size of a packet in which the terminal device sends and receives the service, power at which the terminal device sends and receives the service, a size of a bandwidth at which the terminal device sends and receives the service, and the like. For example, the terminal device is a power meter recording the quantity of electricity used by the tenant, and the service transmission situation of the terminal device is that the power meter sends the packet once a day, and a size of the packet sent each time is 20 mega.

The activation ratio of the terminal device may indicate a ratio of a quantity of terminal devices in an activated state to the quantity of all the terminal devices, or may indicate a ratio of a quantity of terminal devices in an activated state at a moment to the quantity of all the terminal devices.

The usage time of the service may indicate a time at which the terminal device uses the service. For example, the service of reading the power meter is performed at the last day of each month.

The coverage area of the service may be used to indicate a coverage situation of the service, may indicate a service coverage level or a service coverage scenario. For example, the service coverage scenario may be an in-building coverage, an outdoor coverage, a suburban area coverage, a subway coverage, a tunnel coverage, and the like. The service coverage level may be a strong coverage, a common coverage, a weak coverage, and the like.

The moving condition of the terminal device may include at least one of the following situations: whether the terminal device is moving, a quantity of terminal devices in a moving state, and a moving level of the terminal device. The moving level of the terminal device may include one or more of the following: high speed, middle speed, low speed, not moving, and the like.

The roaming condition of the terminal device may include at least one of the following situations: whether the terminal device is roaming, a quantity of terminal devices that may roam at different times, and the like.

Optionally, for facilitating managing the network slice by the network management unit, the method shown in FIG. 4 may further include:

sending, by the service management unit, the deployment information of the network slice to the network management unit; and receiving, by the network management unit, the deployment information of the network slice sent by the service management unit, and managing the network slice based on the deployment information of the network slice.

The service management unit may send a network slice management request message to the network management unit, where the network slice management request message is used to request the network management unit to manage the network slice, and the network slice management request message carries the deployment information of the network slice, so that the network management unit obtains the deployment information of the network slice from the network slice management request message.

That the network management unit manages the network slice based on the deployment information of the network slice may indicate deploying or selecting existing network resources (including at least one of the following information: a network function, a network slice subnet, and a transmission resource) in the network, and combining the network resources together as the network slice, to satisfy the deployment information of the network slice. The selecting of an available network slice in an existing network may indicate selecting a network slice that has been deployed by the network management unit in a management range, to satisfy the deployment information of the network slice. That the network slice satisfies the deployment information of the network slice may indicate that all of the deployment area, the capacity, and the provided service of the network slice satisfy a requirement of the deployment information of the network slice.

Alternatively, the network slice may include a plurality of network components, to refine a deployment granularity, the managing, by the network management unit, the network slice based on the deployment information of the network slice may further include:

determining, by the network management unit, deployment information of a network component based on the deployment information of the network slice; and sending, by the network management unit, the deployment information of the network component to a component management unit, so that the component management unit deploys the network component based on the deployment information of the network component, where the deployment information of the network component is used to deploy the network component.

The determining, by the network management unit, the deployment information of the network component based on the deployment information of the network slice may include: when the network slice includes one network component, the network slice and the network component may be considered as a same network instance, and the deployment information of the network slice is the same as the deployment information of the network component. In this case, the network management unit deploys the network component based on the deployment information of the network component or selects the available network component in the existing network; or when the network slice includes at least two network components, the network management unit decomposes the deployment information of the network slice into deployment information of the at least two network components that is in a one-to-one correspondence with the at least two network components, deploys the at least two network components based on the deployment information of the at least two network components, or selects the available network component in the existing network.

When the network slice includes at least two network components, the network management unit decomposes the deployment information of the network slice into deployment information of the at least two network components that is in a one-to-one correspondence with the at least two network components, and sends the deployment information of the network components to the component management unit, so that the component management unit deploys the network component based on the deployment information of the network component, or selects the available network component in the existing network; or when the network slice includes only one network component, the network slice is the network component. To be specific, the network slice and the network component may be considered as a same network instance, and the deployment information of the network slice is the same as the deployment information of the network component. In this case, the network management unit sends the deployment information of the network slice to the component management unit, so that the component management unit deploys the network slice based on the deployment information of the network slice or selects the available network slice in the existing network.

In this application, the network management unit may decompose the deployment information of the network slice into the deployment information of the at least two network components by using an existing algorithm. Details are not described herein again.

The deploying of the network component may include deploying or selecting existing network resources (including at least one of the following: a network function, the network component, and a transmission resource) in the network, and combining the network resources together as the network component, to satisfy the deployment information of the network component. The selecting of an available network component in the existing network may indicate selecting a network component that has been deployed by the network management unit in a management range, to satisfy the deployment information of the network component.

The network management unit may determine whether the network slice includes one or at least two network components by using the following manners.

The network management unit determines that the network slice includes one or more network components based on pre-configured information. The pre-configured information is used to describe a case that the network slice includes one or more network components. The pre-configured information may be stored by the network management unit in the network management unit in advance or obtained by the network management unit from another node;

the network management unit receives a message used to indicate that the network slice includes one or more network components, and determines that the network slice includes one or at least two network components based on the message; or the network management unit determines, based on a preset policy and the deployment information of the network slice, that the network slice includes one or more network components. The preset policy may be set based on a requirement. This is not limited herein.

Optionally, before step 402, the method further includes:

sending, by the service management unit, a query request or a subscription request to the network management unit, where the query request is used to query a capability provided by the network management unit, and the subscription request is used to subscribe the capability provided by the network management unit; and receiving, by the network management unit, the query request or the subscription request sent by the service management unit.

Optionally, to clarify a network slice whose capability description information is the capability description information of the network slice that is selected by the service management unit and that satisfies the service requirement, when the capability description information of the network slice is included in the network slice template, the notification message further carries an identifier of the network slice template, and the network slice management request message further carries an identifier of the network slice template;

when the capability description information of the network slice is included in the network slice template, and the network slice template includes the identifier of the service descriptor corresponding to the capability description information of the network slice, the notification message further carries the identifier of the network slice template, and the network slice management request message further carries the identifier of the network slice template or the identifier of the service descriptor corresponding to the capability description information of the network slice; or when the capability description information of the network slice is not included in the network slice template, the notification message further carries the identifier of the service descriptor corresponding to the capability description information of the network slice; and the network slice management request message further carries the identifier of the service descriptor.

Figure 5:
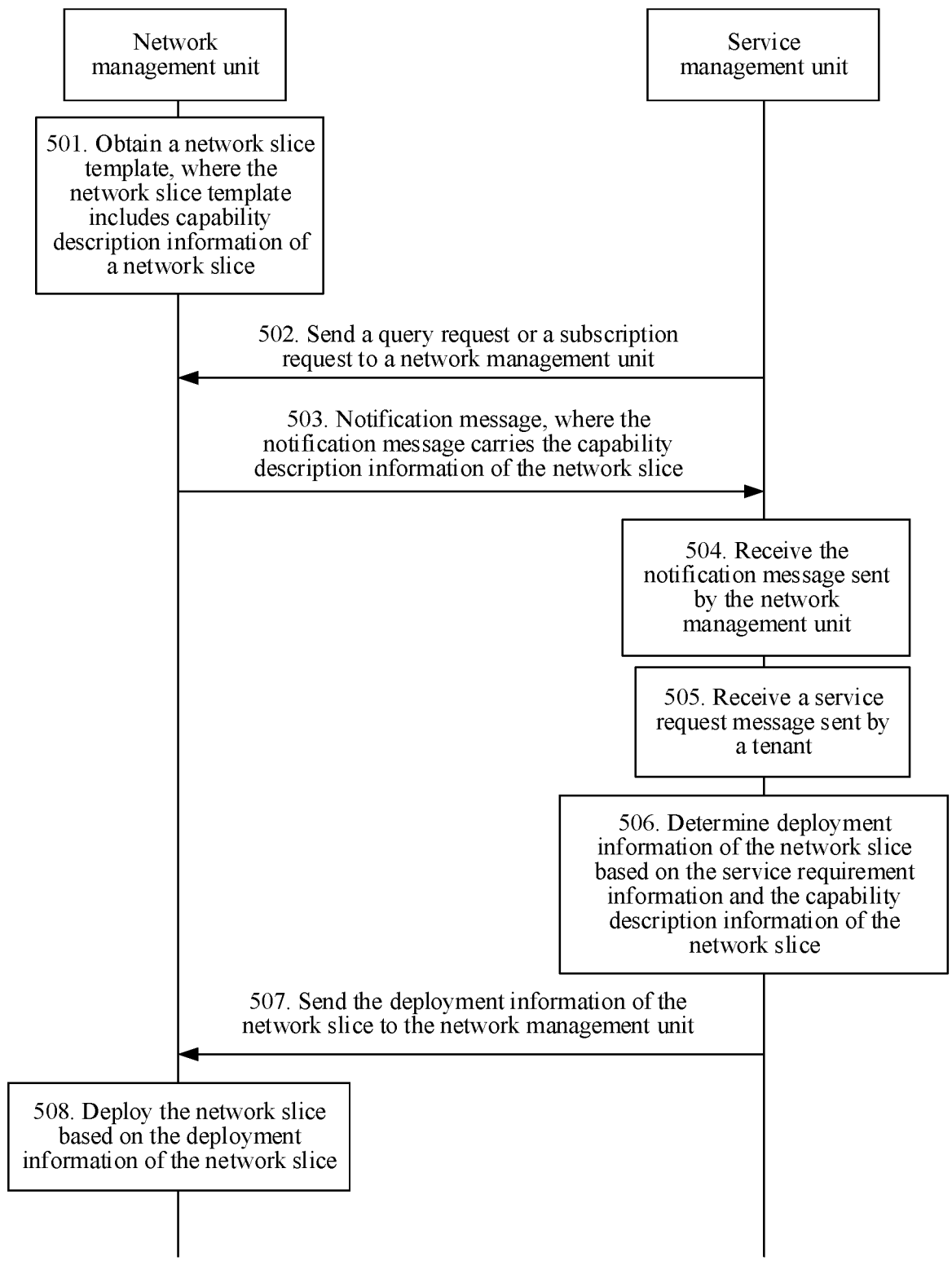
FIG. 5 is a flowchart of a network slice management method according to this application.

Specifically, for the foregoing optional steps, refer to related descriptions in FIG. 5. Details are not described herein again.

FIG. 5 is a flowchart of a network slice management method according to this application. As shown in FIG. 5, the method may include the following steps.

Step 501. A network management unit obtains a network slice template, where the network slice template includes capability description information of a network slice.

For step 501 and the capability description information of the network slice in step 501, refer to related descriptions in step 401. Details are not described herein again.

Step 502. The service management unit sends a query request or a subscription request to the network management unit.

The query request is used to query a capability provided by the network management unit, and the subscription request is used to subscribe the capability provided by the network management unit.

Step 503. The network management unit receives the query request or the subscription request sent by the service management unit, and sends a notification message to the service management unit, where the notification message carries the capability description information of the network slice.

Step 504. The service management unit receives the notification message sent by the network management unit.

Step 505. The service management unit receives a service request message sent by a tenant, where the service request message includes service requirement information.

For step 505 and the service requirement information, refer to related descriptions in the solution shown in FIG. 4. Details are not described herein again.

Step 506. The service management unit determines deployment information of the network slice based on the service requirement information and the capability description information of the network slice.

For a performing process of step 506, refer to related descriptions in the solution shown in FIG. 4. Details are not described herein again.

Step 507. The service management unit sends the deployment information of the network slice to the network management unit.

Step 508. The network management unit receives the deployment information of the network slice, and manages the network slice based on the deployment information of the network slice.

For a process of managing the network slice by the network management unit based on the deployment information of the network slice in step 508, refer to related descriptions in the solution shown in FIG. 4. Details are not described herein again.

It should be noted that in the solution shown in FIG. 5, an interval between step 504 and step 505 is determined based on the time at which the service management unit receives the service request message sent by the tenant, and this does not mean that step 505 is performed immediately after step 504 is performed, and in some cases, step 505 may be performed one or more days after step 504 is performed. To be specific, after step 504 is performed, the service management unit may store the capability description information of the network slice carried by the notification message in the service management unit, and after step 505 is performed, the service management unit performs subsequent steps based on the capability description information of the network slice.

Compared with the prior art, in the solution shown in FIG. 5, the service management unit coordinates with the network management unit to manage and deploy the network slice, and the devices automatically manage the network slice based on the capability description information of the network slice in real time, avoiding a manually negotiated network planning process, improving a network slice management and deployment efficiency, and shortening service online time.

Figure 6:
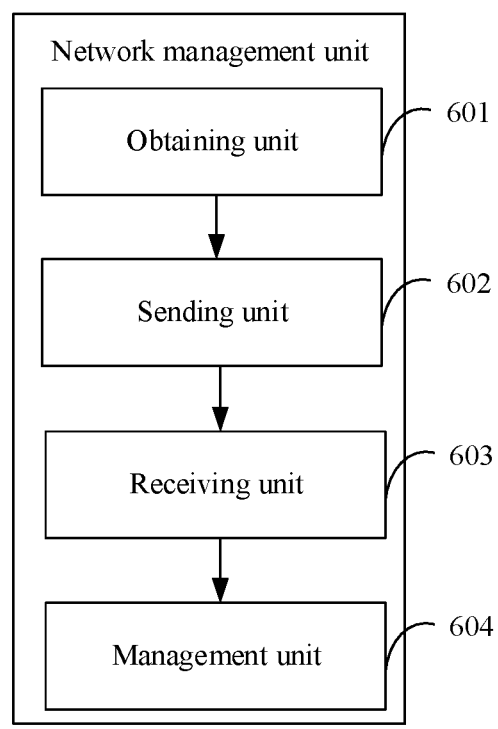
FIG. 6 is a schematic composition diagram of a network management unit according to this application.

FIG. 6 is a schematic composition diagram of a network management unit according to this application. The network management unit may be configured to perform a process performed by the network management unit in the solution shown in FIG. 4 and FIG. 5. As shown in FIG. 6, the network management unit may include an obtaining unit 601 and a sending unit 602.

The obtaining unit 601 is configured to obtain capability description information of a network slice, where the capability description information of the network slice includes at least one of a feature of the network slice and a deployment capability of the network slice.

The sending unit 602 is configured to send a notification message to a service management unit, where the notification message carries the capability description information of the network slice.

For a specific performing process of the obtaining unit 601 and a specific description of the capability description information of the network slice, refer to the description in step 401 shown in FIG. 4. Details are not described herein again.

For a specific performing process of the sending unit 602, refer to step 402. Details are not described herein again.

Optionally, as shown in FIG. 6, the network management unit further includes:
 a receiving unit 603, configured to receive a network slice management request message sent by the service management unit, where the network slice management request message carries the deployment information of the network slice, and the deployment information of the network slice corresponds to the deployment capability of the network slice; and
 a management unit 604, configured to manage the network slice based on the deployment information of the network slice.

For a specific performing process of the management unit 604, refer to a process of managing the network slice by the network management unit in the solution shown in FIG. 4. For example, the management unit 604 may be configured to determine deployment information of a network component based on the deployment information of the network slice, and send the deployment information of the network component to a component management unit through the sending unit 602. The deployment information of the network component is used to deploy the network component, and the network slice includes at least one network component.

The obtaining unit 601 is configured to obtain a network slice template, and obtain the capability description information of the network slice from the network slice template. The network slice template includes the capability description information of the network slice.

Optionally, before the sending unit 602 sends the capability description information of the network slice to the service management unit, the receiving unit 603 is further configured to receive a query request or a subscription request sent by the service management unit, where the query request is used to query a capability provided by the network management unit, and the subscription request is used to subscribe the capability provided by the network management unit.

The feature of the network slice may include any one of the following:
 a service type, a type of the network slice, a success rate of service invocation, a success rate of service usage, a service or network coverage level, a service or network coverage area, service or network latency, a throughput, mobility of a terminal device, a data size, reliability information, and a minimum user rate.

The deployment capability of the network slice may include at least one of the following:
 a service deployment area, a capacity, a service traffic model, an energy saving switch, latency, the mobility of the terminal device, the success rate of service invocation, the success rate of service usage, the minimum user rate, an affinity, an anti-affinity, a security level, and an isolation level.

For the related content of the steps in the foregoing method embodiments refer to the functional descriptions of functional modules corresponding to the network management unit. Details are not described herein again.

Figure 7:
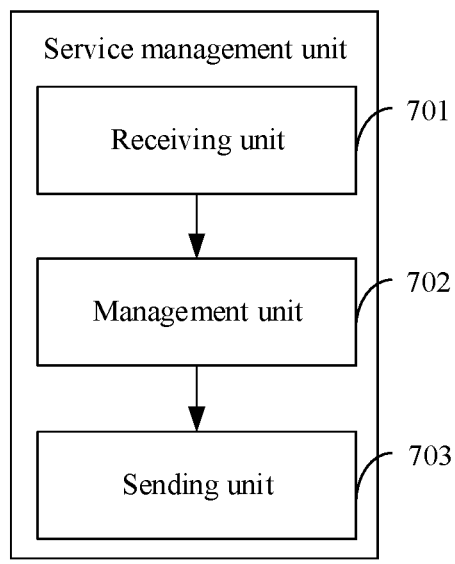
FIG. 7 is a schematic composition diagram of a service management unit according to this application.

FIG. 7 is a schematic composition diagram of a service management unit according to this application. The service management unit may be configured to perform a process performed by the service management unit in the solution shown in FIG. 4 and FIG. 5. As shown in FIG. 7, the service management unit may include a receiving unit 701 and a management unit 702.

The receiving unit 701 is configured to receive a notification message from a network management unit, where the notification message carries capability description information of a network slice, the capability description information of the network slice is used to describe a capability of the network slice, and the capability description information of the network slice includes at least one of a feature of the network slice and a deployment capability of the network slice.

The management unit 702 is configured to manage the network slice based on the capability description information of the network slice.

For a specific performing process of the receiving unit 701 and a specific description of the capability description information of the network slice, refer to the description in step 403. Details are not described herein again.

Specifically, the service management unit 702 shown in FIG. 7 further includes a sending unit 703.

The management unit 702 is configured to: receive a service request message through the receiving unit 701, where the service request message includes service requirement information;
 determine deployment information of the network slice based on the service requirement information and the capability description information of the network slice; and
 send a network slice management request message to the network management unit through the sending unit 703, where the network slice management request message includes the deployment information of the network slice.

The service requirement information includes at least one of a service feature and a service deployment requirement.

Optionally, before the receiving unit 701 receives the capability description information of the network slice, the sending unit 703 is further configured to send a query request or a subscription request to the network management unit, where the query request is used to query a capability provided by the network management unit, and the subscription request is used to subscribe the capability provided by the network management unit.

The feature of the network slice includes any one of the following:
 a service type, a type of the network slice, a success rate of service invocation, a success rate of service usage, a service or network coverage level, a service or network coverage area, service or network latency, a throughput, mobility of a terminal device, a data size, reliability information, and a minimum user rate.

The deployment capability of the network slice includes at least one of the following:
a service deployment area, a capacity, a service traffic model, an energy saving switch, latency, the mobility of the terminal device, the success rate of service invocation, the success rate of service usage, the minimum user rate, an affinity, an anti-affinity, a security level, and an isolation level.

Specifically, the related content of the steps in the foregoing method embodiments may be referred to functional descriptions of functional modules corresponding to the service management unit. Details are not described herein again.

In applications, the network slice may include a plurality of network components, and deploy the network components included in the network slice means deploying the network slice. Therefore, to refine a deployment granularity of the network slice, in another optional solution, the management and deployment of the network slice may further be implemented by managing and deploying the network component. For details, refer to the solution shown in FIG. 8 to FIG. 13.

Figure 8:
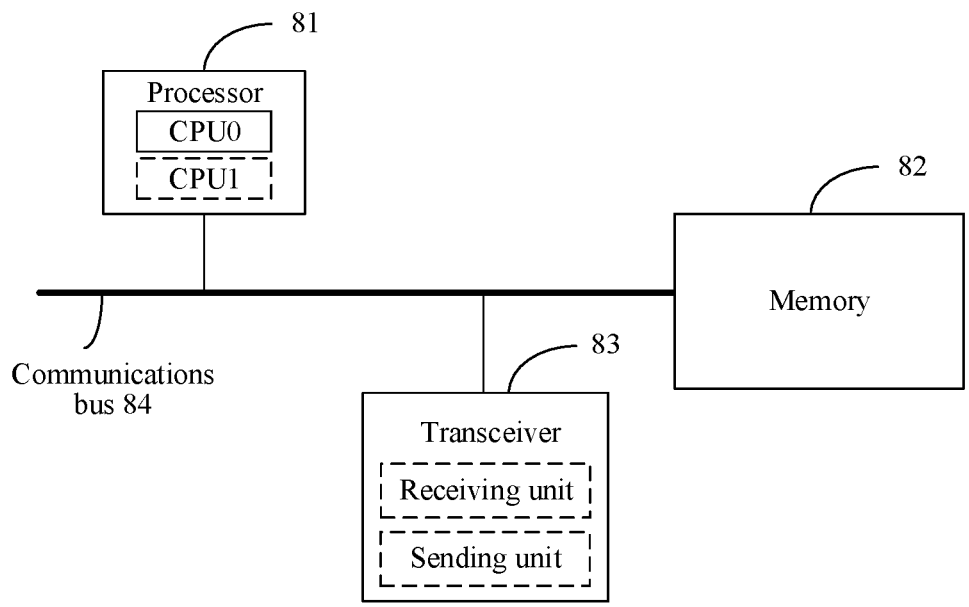
FIG. 8 is a schematic composition diagram of a network component management apparatus according to this application.

FIG. 8 is a network component management apparatus according to this application. The apparatus may be a first network management unit, for example, the component management unit in FIG. 1, and the apparatus may include at least one processor 81, a memory 82, a transceiver 83, and a communications bus 84. It should be noted that the network component management apparatus shown in FIG. 8 constitutes no limitation on the apparatus, and may include more or fewer components than those shown in the figure, or some components may be combined, or a different component deployment may be used. This is not limited in this application. The following describes the components of the management unit with reference to FIG. 8.

The processor 81 is a control center of the network component management apparatus, may be a processor, and may also be a collective name of a plurality of processing elements. For example, the processor 81 is a CPU, an ASIC, or one or more integrated circuits configured to implement this application, for example, one or more DSPs or one or more FPGAs. The processor 81 may perform various functions of the network component management apparatus by running or executing a software program stored in the memory 82 and invoking data stored in the memory 82.

The memory 82 may be a ROM or another type of static storage device that can store static information and a static instruction, or a RAM or another type of dynamic storage device that can store information and an instruction; or may be an EEPROM, a CD-ROM or another compact-disc storage, optical disc storage (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 82 may exist independently, and connect to the processor 81 by using the communications bus 84. The memory 82 may alternatively be integrated with the processor 81. The memory 82 is configured to store a software program for executing the solutions provided in this application, and the processor 81 controls execution.

The transceiver 83 is configured to communicate with another device or a communications network such as an Ethernet, a RAN, or a WLAN. The transceiver 83 may include a receiving unit to implement a receiving function and a sending unit to implement a sending function.

The communications bus 84 may be an ISA bus, a PCI bus, an EISA bus, or the like. The bus may be classified into an address bus, a data bus, a control bus, and the like. For ease of representation, only one thick line is used to represent the bus in FIG. 8, but this does not mean that there is only one bus or only one type of bus.

The processor 81 is configured to obtain capability description information of a network component, where the capability description information of the network component includes at least one of network service description information and a deployment capability of the network component, and the network component includes at least one network service.

The transceiver 83 is configured to send a notification message to a second network management unit, where the notification message carries the capability description information of the network component.

In another embodiment of this application, the transceiver 83 is further configured to receive network component requirement information sent by the second network management unit; and
the processor 81 is further configured to deploy the network component based on the network component requirement information.

In another embodiment of this application, the network component requirement information includes the deployment information of the network component; and the processor 81 is configured to: determine a quantity of instances of the network service and deployment information of the network service based on the deployment information of the network component; and
deploy the network service based on the quantity of instances of the network service and the deployment information of the network service.

In another embodiment of this application, the transceiver 83 is further configured to obtain a network component template, where the network component template includes the capability description information of the network component; and
the processor 81 is configured to obtain the capability description information of the network component from the network component template.

In another embodiment of this application, the processor 81 is further configured to record an association relationship between the network component and the network service included in the network component, in the memory 82.

The foregoing embodiments merely briefly describe the functions of the processor 81, the memory 82, and the transceiver 83. For specific working procedures and functions of the processor 81, the memory 82, and the transceiver 83, refer to the related content described in method embodiments corresponding to FIG. 10 and FIG. 11. For example, a processing process of the first network management unit described in the following method embodiments is performed by the processor 81, a storing process of the first network management unit is performed by the memory 82, and a receiving process and a sending process of the first network management unit are performed by the transceiver 83.

Another embodiment of this application provides a computer storage medium. The computer storage medium is configured to store a computer software instruction used by the network component management apparatus, and the computer software instruction includes a program used to perform solutions described in FIG. 10 and FIG. 11.

Figure 9:
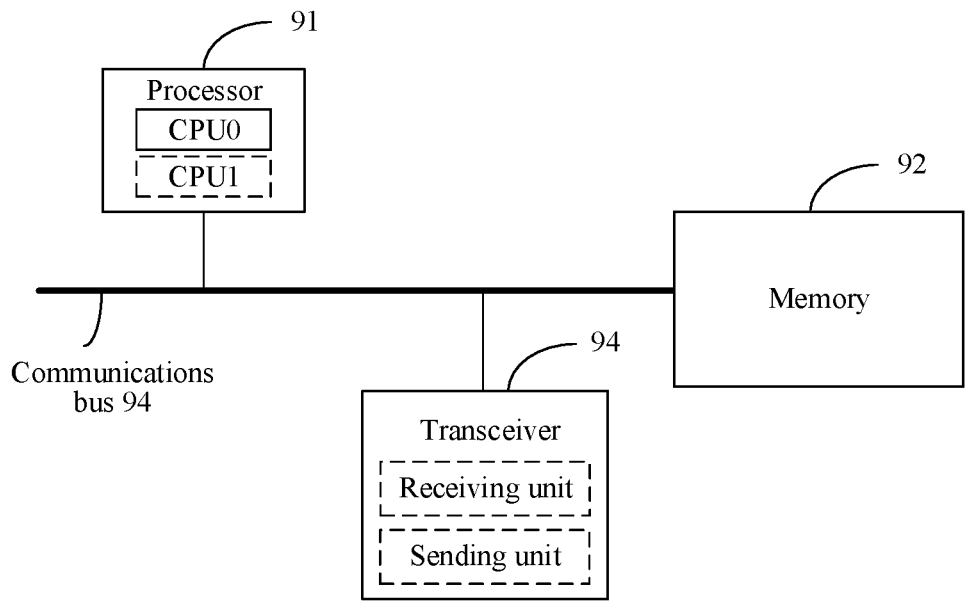
FIG. 9 is a schematic composition diagram of a network component management apparatus according to this application.

FIG. 9 is a network component management apparatus according to this application. The apparatus may be a second network management unit, for example, the network management unit in FIG. 1, and the apparatus may include at least one processor 91, a memory 92, a transceiver 93, and a communications bus 94. It should be noted that the network component management apparatus shown in FIG. 9 constitutes no limitation on the apparatus, and may include more or fewer components than those shown in the figure, or some components may be combined, or a different component deployment may be used. This is not limited in this application. The following specifically describes the components of the management unit with reference to FIG. 9.

The processor 91 is a control center of the network component management apparatus, may be a processor, and may also be a collective name of a plurality of processing elements. For example, the processor 91 is a CPU, an ASIC, or one or more integrated circuits configured to implement this application, for example, one or more DSPs or one or more FPGAs. The processor 91 may perform various functions of the network component management apparatus by running or executing a software program stored in the memory 92 and invoking data stored in the memory 92.

The memory 92 may be a ROM or another type of static storage device that can store static information and a static instruction, or a RAM or another type of dynamic storage device that can store information and an instruction; or may be an EEPROM, a CD-ROM or another compact-disc storage, optical disc storage (including a compact disc, a laser disk, an optical disc, a digital versatile disc, a Blu-ray disc, or the like) and magnetic disk storage medium, another magnetic storage device, or any other medium that can be configured to carry or store expected program code in a form of an instruction or a data structure and that is accessible by a computer, but is not limited thereto. The memory 92 may exist independently, and connect to the processor 91 by using the communications bus 94. The memory 92 may alternatively be integrated with the processor 91. The memory 92 is configured to store a software program for executing the solutions provided in this application, and the processor 91 controls execution.

The transceiver 93 is configured to communicate with another device or a communications network such as an Ethernet, a RAN, or a WLAN. The transceiver 93 may include a receiving unit to implement a receiving function and a sending unit to implement a sending function.

The communications bus 94 may be an ISA bus, a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

The transceiver 93 is configured to obtain capability description information of a network component, where the capability description information of the network component includes at least one of network service description information and a deployment capability of the network component, and the network component includes at least one network service.

The processor 91 is configured to manage the network component based on the capability description information of the network component.

In another embodiment of this application, the processor 91 is configured to: receive a network management request message through the transceiver 93, where the network management request message carries network requirement information;
  determine network component requirement information based on the capability description information of the network component and the network requirement information; and
  send the network component requirement information to the first network management unit through the transceiver 93.

In another embodiment of this application, the processor 91 is configured to generate a network slice template based on the capability description information of the network component, where a network slice corresponding to the network slice template includes at least one network component.

In another embodiment of this application, the processor 91 is configured to receive a notification message from the first network management unit through the transceiver 93, and obtain the capability description information of the network component from the notification message, where the notification message includes the capability description information of the network component; or
  the processor 91 is configured to obtain a network component template, and obtain the capability description information of the network component from the network component template, where the network component template includes the capability description information of the network component.

In another embodiment of this application, the capability description information of the network component is included in the network component template, and the processor 91 is further configured to generate a network template based on the network component template, where the network template includes network service link description information, and the network service link description information is used to describe an association relationship between different network services.

In another embodiment of this application, the memory 92 is configured to store a computer program instruction and data, the processor 91 invokes the computer program instruction and the data to perform corresponding functions, and trigger the transceiver 93 to perform corresponding functions. Details are not described herein again.

The foregoing embodiments merely briefly describe the functions of the processor 91, the memory 92, and the transceiver 93. For specific working procedures and functions of the processor 91, the memory 92, and the transceiver 93, refer to related content described in method embodiments corresponding to FIG. 10 and FIG. 11. For example, a processing process of the second network management unit described in the following method embodiments is performed by the processor 91, a storing process of the service management unit is performed by the memory 92, and a receiving process and a sending process of the service management unit are performed by the transceiver 93.

Another embodiment of this application provides a computer storage medium. The computer storage medium is configured to store a computer software instruction used by the network component management apparatus, and the computer software instruction includes a program used to perform solutions described in FIG. 10 and FIG. 11.

The following describes the network slice management method provided in this application in detail with reference to the communications system shown in FIG. 1. Devices in the following method embodiments may correspondingly include the components shown in FIG. 8 and FIG. 9. It should be noted that although an order is shown in the method flowchart, in some cases, shown or described steps may be performed in an order different from the order shown herein.

Figure 10:
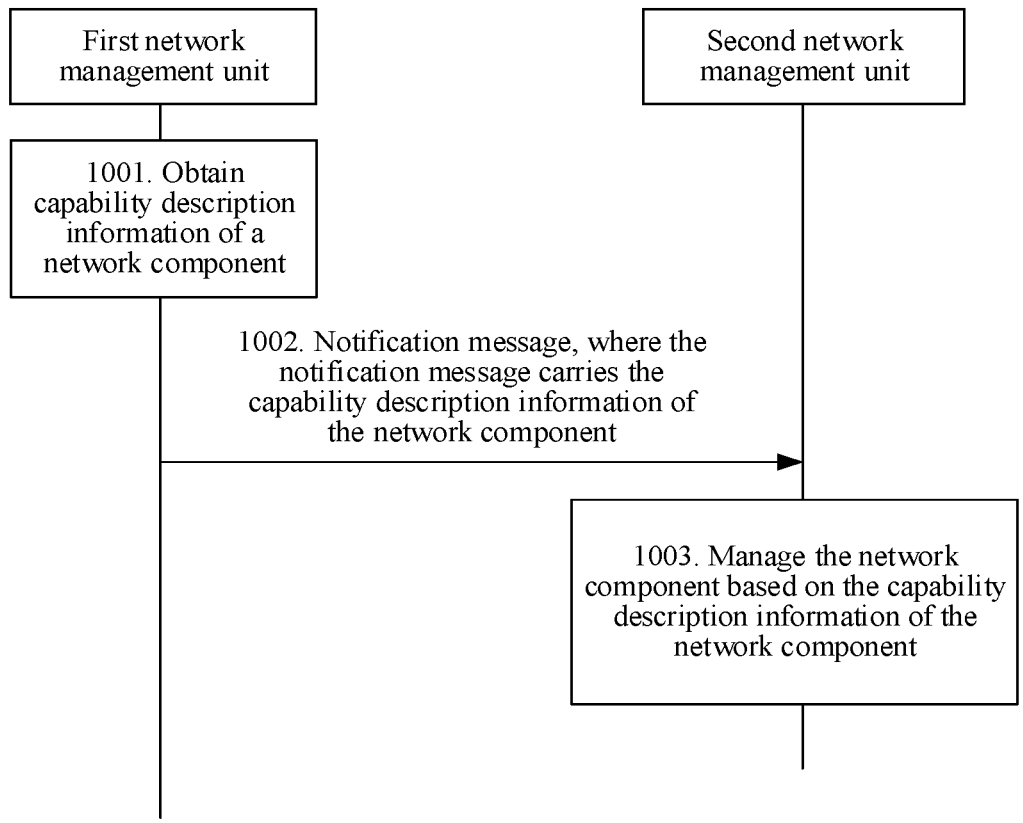
FIG. 10 is a flowchart of a network component management method according to this application.

FIG. 10 is a flowchart of another network slice management method according to this application. As shown in FIG. 10, the method may include the following steps.

Step 1001. A first network management unit obtains capability description information of a network component.

The first network management unit may be the component management unit shown in FIG. 1. The first network management unit may deploy the network component, and the network component deployed by the first network management unit may include at least one network service. That the network component includes at least one network service may indicate that the network component may provide at least one network service to the outside.

The capability description information of the network component may provide a basis for deploying the network component by the first network management unit, the capability description information of the network component is related information of the network component, and may include at least one of network service description information of the network component and a deployment capability of the network component.

The capability description information of the network component exists independently, or may be included in a network component template. To be specific, step 1001 may be replaced by that the first network management unit obtains the network component template. The network component template includes the capability description information of the network component.

Optionally, when the capability description information of the network component is included in the network component template, the first network management unit may allocate an identifier (for example, an identifier of the network component template) for each network component template, and allocate an identifier (for example, an identifier of a component capability descriptor) for the capability description information of the network component in the network component template, to identify the capability description information of the network component in the network component template; or when the capability description information of the network component is included in the network component template, and the network component template includes the identifier corresponding to the capability description information of the network component, the first network management unit may allocate only one identifier for each network component template, to identify the network component template.

The network service description information of the network component may be used to describe a feature of a service (for example, the network service) provided by the network component deployed by the first network management unit to the outside. The network service description information may also be referred to as endpoint description information providing the network service. This is not limited herein. Specifically, for the network service description information of the network component, refer to the following related descriptions. Details are not described herein again.

The deployment capability of the network component may be used to describe a capacity, a deployment area, and the like carried by the network component deployed by the first network management unit. Specifically, for the deployment capability of the network component, refer to the following related descriptions. Details are not described herein again.

Optionally, the first network management unit may obtain the capability description information of the network component by using any one of the following manners.

Manner 1. The first network management unit obtains the capability description information of the network component from a network component provider.

Manner 2. The first network management unit obtains the network component template from the network component provider, and obtains the capability description information of the network component from the network component template, where the network component template includes the capability description information of the network component.

The network component provider in Manner 1 and Manner 2 may be a network component designer or a network component template provider, for example, may be a device manufacturer.

Manner 3. The network component template is stored in a database, the first network management unit accesses the database, and obtains the capability description information of the network component from the database.

Manner 4. The network component template is stored in the database in advance, the first network management unit accesses the database, obtains the network component template from the database, and obtains the capability description information of the network component from the network component template, where the network component template includes the capability description information of the network component.

The database in Manner 3 and Manner 4 may be a database independent from the first network management unit.

It should be noted that in Manner 1 and Manner 3, after receiving the capability description information of the network component, the first network management unit may further store the received capability description information of the network component locally or in a database accessible by the first network management unit, and allocates an identifier used to identify the capability description information of the network component for the capability description information of each network component; and in Manner 2 and Manner 4, after obtaining the network component template, the first network management unit may store the network component template locally or in the database accessible by the first network management unit, allocate an identifier of the network component template for each network component template, and allocate an identifier used to identify the capability description information of the network component to the network component template including the capability description information of the network component. Alternatively, when the network component template obtained by the first network management unit includes the identifier of a service descriptor corresponding to the capability description information of the network component, the first network management unit allocates the identifier of the network component template only to the obtained network component template.

Step 1002. The first network management unit sends a notification message to a second network management unit, where the notification message carries the capability description information of the network component.

The second network management unit may be the network management unit in FIG. 1.

Optionally, the first network management unit may send the notification message through a communications interface between the first network management unit and the second network management unit. The communications interface may be a life cycle management interface, a subscription interface, a notification interface, a configuration interface, a performance management interface, a fault management interface, and the like.

Step 1003. The second network management unit receives the capability description information of the network component, and manages the network component based on the capability description information of the network component.

The second network management unit may receive the notification message from the first network management unit, and obtain the capability description information of the network component from the notification message.

Optionally, that the second network management unit manages the network component based on the capability description information of the network component includes any one of the following manners.

Manner 1. The second network management unit receives a network management request message, where the network management request message carries network requirement information;

the second network management unit determines network component requirement information based on the capability description information of the network component and the network requirement information; and the second network management unit sends a network component management request message to the first network management unit, where the network component management request message carries the network component requirement information.

The network management request message is used to request the second network management unit to manage the network component.

The network requirement information may include the network service description information and a network deployment requirement. The network service description information included in the network requirement information may include one or more information that is in the network service description information and that is included in the capability description information of the network component. The network deployment requirement may include one or more information in the deployment capability of the network component.

The network component requirement information may include the deployment information of the network component.

Optionally, that the second network management unit determines the network component requirement information based on the capability description information of the network component and the network requirement information includes: determining, by the second network management unit, the network service description information and the network deployment requirement based on the network requirement information;

querying, by the second network management unit, the capability description information of the network component sent by the first network management unit, and selecting the capability description information of the network component in which the network service description information of the network component satisfies the network service description information included in the network requirement information and the deployment capability of the network component satisfies the network deployment requirement; and obtaining, by the second network management unit, the network component requirement information corresponding to the capability description information of the network component based on the network requirement information.

It should be noted that in this application, if the second network management unit selects the capability description information of the network component in which the network service description information of the network component satisfies the network service description information included in the network requirement information and the deployment capability of the network component satisfies the network deployment requirement, it indicates that the second network management unit can deploy the network component satisfying the network requirement; and if the second network management unit cannot select the capability description information of the network component in which the network service description information of the network component satisfies the network service description information included in the network requirement information and the deployment capability of the network component satisfies the network deployment requirement, it indicates that the second network management unit cannot deploy the network component satisfying the network requirement.

That the network service description information of the network component satisfies the network service description information included in the network requirement information may indicate that the network service description information of the network component is the same as the network service description information included in the network requirement information. That the deployment capability of the network component satisfies the network deployment requirement may indicate that the deployment capability of the network component is the same as the network deployment requirement or the deployment capability of the network component is greater than the network deployment requirement.

That the second network management unit obtains the network component requirement information corresponding to the capability description information of the network component based on the network requirement information includes that the second network management unit directly uses the network deployment requirement included in the network requirement information as the deployment information of the network component.

For example, the network deployment requirement is that a capacity is 500,000, a deployment area is Shanghai Pudong area, and the like. The deployment capability of the network component is that the capacity is 500,000, and the deployment area is Shanghai Pudong and Shanghai Puxi. In this case, the deployment capability of the network component is greater than the network deployment requirement. To be specific, if the network deployment requirement is satisfied, the network deployment requirement may directly be used as the deployment information of the network component: the capacity is 500,000, and the deployment area is Shanghai Pudong area.

Manner 2. The second network management unit generates a network slice template based on the capability description information of the network component.

The network slice corresponding to the network slice template includes at least one network component, the network slice template may include but is not limited to the network service description information of the network component, and may further include an association relationship between the network component and the network service. It should be noted that the association relationship between the network component and the network service may be replaced by an association relationship between the network component and an endpoint (for example, a network service endpoint) providing the network service.

That the second network management unit generates the network slice template based on the capability description information of the network component includes: writing, by the second network management unit, the capability description information of the network component into the network slice template, to generate the network slice template, and allocating an identifier of the network slice template for the network slice template, so that after obtaining the network slice template, the second network management unit performs the solution shown in FIG. 3.

Compared with the prior art, in the solution shown in FIG. 10, the first network management unit obtains the capability description information of the network component, and sends the capability description information of the network component to the second network management unit, the second network management unit manages the network component based on the capability description information of the network component, and the devices automatically manage the network component based on the capability description information of the network component, to manage the network slice including the network components, avoiding a manually negotiated network planning process, improving network slice management efficiency, and shortening a service online time.

It should be noted that in the solution shown in FIG. 10, the second network management unit may further directly receive the network component template including the capability description information of the network component or the capability description information of the network component from a vendor, and does not need to obtain from the notification message sent by the first network management unit to the second network management unit. To be specific, step 1001 to step 1003 in the solution shown in FIG. 10 may be replaced by that the second network management unit receives the capability description information of the network component from the vendor, and manages the network component based on the capability description information of the network component.

In the solution shown in FIG. 10, the network service description information of the network component may include but is not limited to a network service type (netservice type), a network service feature (netservice feature), and a network service operation (netservice operation). For example, the related information may further include a required network service. The required network service may indicate a network service of another network component that needs to be invoked or of the network component when the network component provides the network service to the outside.

Specifically, the network service type may be used to describe a type of network service that can be provided to the outside based on the network component deployed by the network component template. The network service type may be shown in Table 1, and includes but is not limited to at least one of the following network services: an AMF service, an UDM service, a PCF service, a NEF service, an NRF service, an SMF service, an SMSF service, an AUSF service, an NWDAF service, a gNB CU service, a gNB DU service, a gNBURLLC service, a gNBeMBB service, and a gNBmIoTservice.

The network service feature may correspond to the network service, and may be used to describe a feature of a type of network service. The network service feature includes but is not limited to at least one of the following features: invocation time of the network service, mobility of a terminal device, a success rate of network service invocation, and a coverage level of the network service. The invocation time of the network service may be referred to as network service latency, and indicates a time during which the network component provides the network service to the outside. The terminal device may indicate a device that can obtain or use the network service. The mobility of the terminal device may include but is not limited to: whether the terminal device is moving, a quantity of terminal devices in a moving state, and a moving level of the terminal device. The moving level of the terminal device may include one or more of the following: high speed, middle speed, low speed, not moving, and the like. The success rate of network service invocation may indicate a probability at which a client or another device successfully uses the network service. The coverage level of the network service may include a coverage level or a coverage scenario of the network service. The coverage level of the network service may be strong coverage, common coverage, weak coverage, and the like. The coverage scenario of the network service may be for example, an in-building coverage, an outdoor coverage, a suburban area coverage, a subway coverage, a tunnel coverage, and the like.

The network service operation may correspond to the network service, and is used to describe an operation performed by a third party (for example, the client) or another device on a type of network service. The network service operation may include but is not limited to at least one of the following operations: a network service subscription, a network service monitor, a network service de-subscription, a network service invocation, a protocol data unit (PDU) session establish, and a policy creation. The network service subscription may indicate a situation in which the third party or another device subscribes the network service provided by the network component. The network service monitor may indicate a situation in which the third party or the other device monitors the network service provided by the network component. The network service un-subscription may indicate that the third party or the other device does not subscribe the network service provided by the network component any more. The network service invocation may indicate a situation in which the third party or the other device invokes the network service. The protocol data unit session establish may indicate bearing a situation of establishing the PDU session of the network service. The policy creation may indicate setting a routed rule for UE.

In the solution shown in FIG. 10, the deployment capability of the network component may include a deployment capability of at least one network service. The deployment capability of the network component may be used to describe the deployment situations of the network component and functions enabled by the network component in a case that the network component provides a plurality of network services to the outside. The deployment capability of the network component may include but is not limited to a capacity of the network component, a location constraint condition of the network component, and the like. Function information supported by the network component includes but is not limited to an energy saving function, an automatic controller setting, an automatic recovery function, and the like. The capacity of the network component may be replaced by the coverage area of the network component.

The capacity of the network component may indicate a quantity of terminal devices carried by the network component. The capacity may be a fixed value (for example, one million or two million) or a value range (for example, a value range between one million and two million), and the coverage area of the network component. The location constraint condition of the network component may be used to limit a location at which the network component is deployed. Specifically, the location constraint condition of the network component may indicate an affinity of the network component and an anti-affinity of the network component. The affinity of the network component may indicate that when the network component and another network component may be deployed in a same location area, the affinity exists between the network component and another network component. The anti-affinity of the network component may indicate that when the network component and the other network component cannot be deployed in a same location area, the anti-affinity exists between the network component and the another network component.

It should be noted that the network component template in this application is named for the purpose of convenient description, and another name may be used to describe the same functionality or feature of the system or element described herein. For example, the network component template may further be named as a network function template, a network slice subnet template, or the like. The template described in this application may be replaced by a descriptor or a blueprint. This is not limited herein. For example, the network component template may be replaced by a network component descriptor or a network component description blueprint.

Optionally, to facilitate deploying the network component, the solution shown in FIG. 10 further includes:
sending, by the second network management unit, a network component management request message to the first network management unit, where the network component management request message carries the network component requirement information; and
receiving, by the first network management unit, the network component requirement information sent by the second network management unit, and deploying the network component based on the network component requirement information.

That the first network management unit deploys the network component based on the network component requirement information may include deploying or selecting existing network resources (including at least one of the following information: a network function, the network component, and a transmission resource) in the network, and combining the network resources together as the network component, to satisfy the network component requirement information. The selecting of the available network component in the existing network may indicate selecting a network component that has been deployed by the second network management unit in a management range, to satisfy the network component requirement information.

Alternatively, the network component includes one or more network services, the network component requirement information includes the deployment information of the network component, and the deployment information of the network component corresponds to the deployment capability of the network component. To refine a deployment granularity of the network component, that the first network management unit deploys the network component based on the network component requirement information may further include:

determining, by the first network management unit based on the deployment information of the network component, a quantity of instances of the network service included in the network component and the deployment information of the network service; and
deploying, by the first network management unit, the network service based on the quantity of instances of the network service included in the network component and the deployment information of the network service.

In the embodiments of this application, the network service corresponds to the services provided by the endpoint (also referred to as a network service endpoint). The determining of the quantity of instances of the network service included in the network component may include determining a quantity of endpoints providing the network service; the determining of the deployment information of the network service may include determining deployment information of the endpoint providing the network service; and the deploying of the network service may include deploying the endpoint providing the network service.

Optionally, the first network management unit determines, by using a local capacity calculation algorithm, the quantity of instances of the network service included in the network component and the deployment information of the network service.

That the first network management unit deploys the network service may indicate that the first network management unit configures a corresponding network resource (for example, a virtual network resource), so that the first network management unit may provide the network service to the outside.

Optionally, before step 1002, the method further includes:
sending, by the second network management unit, a query request or a subscription request to the first network management unit, where the query request is used to query a capability provided by the first network management unit, and the subscription request is used to subscribe the capability provided by the first network management unit; and
receiving, by the first network management unit, the query request or the subscription request sent by the second network management unit.

Optionally, to clarify a network component template and a network component whose capability description information is the capability description information of the network component that is selected by the second network management unit and that satisfies the network requirement, where the network component is in the network component template, the notification message further carries an identifier of the network component template, and the network component management request message further carries an identifier of the network component template.

Optionally, the solution shown in FIG. 10 further includes:
recording, by the first network management unit, an association relationship between the network component and at least one network service included in the network component.

The recording of the association relationship between the network component and the at least one network service included in the network component may indicate recording an association relationship between the network component and an endpoint that provides the network service and that is included in the network component.

Optionally, the capability description information of the network component is included in the network component template, and the solution shown in FIG. 10 further includes:

generating, by the second network management unit, a network template based on the network component template, where the network template includes network service link description information, and the network service link description information is used to describe an association relationship between different network services.

The network service link description information is used to deploy an instance of a network service link, that is, provides a deployment basis for deploying the instance of the network service link by the second network management unit. The network service link description information may be used to describe an invocation or reliance relationship between network services provided by different network components.

The network service link description information may include source service description information, destination service description information, and link requirement information. The source service description information may include source network component information and network service description information corresponding to the source network component information. The destination service description information includes destination network component information and network service description information corresponding to the destination network component information. The source network component information is used to identify the source network component, the destination network component is used to identify the destination network component, and the link requirement information may include requirement information such as latency and a bandwidth, and is used to define a requirement that can be satisfied by the instance of the network service link established between the source network component and the destination network component.

In this application, the service description information may be replaced by description information of the endpoint providing the network service. For example, the source service description information may be replaced by source service endpoint description information, and the destination service description information may be replaced by destination service endpoint description information. This is not limited herein.

It should be noted that in this application, the source network component and the destination network component are relative concepts. The source network component is a network component invoking a network service provided by another network component, and the destination network component is a network component whose network service is invoked by the other network component.

For example, if information included in the network service link description information is that the source network component is a network component 1, the destination network component is a network component 2, the latency is 2 s, and the bandwidth is 10 M, it indicates that the instance of the network service link needs to be established between the network component 1 and the network component 2, the instance of the network service link requires that the latency cannot be greater than 2 s, and the bandwidth cannot be greater than 10 M.

Figure 11:
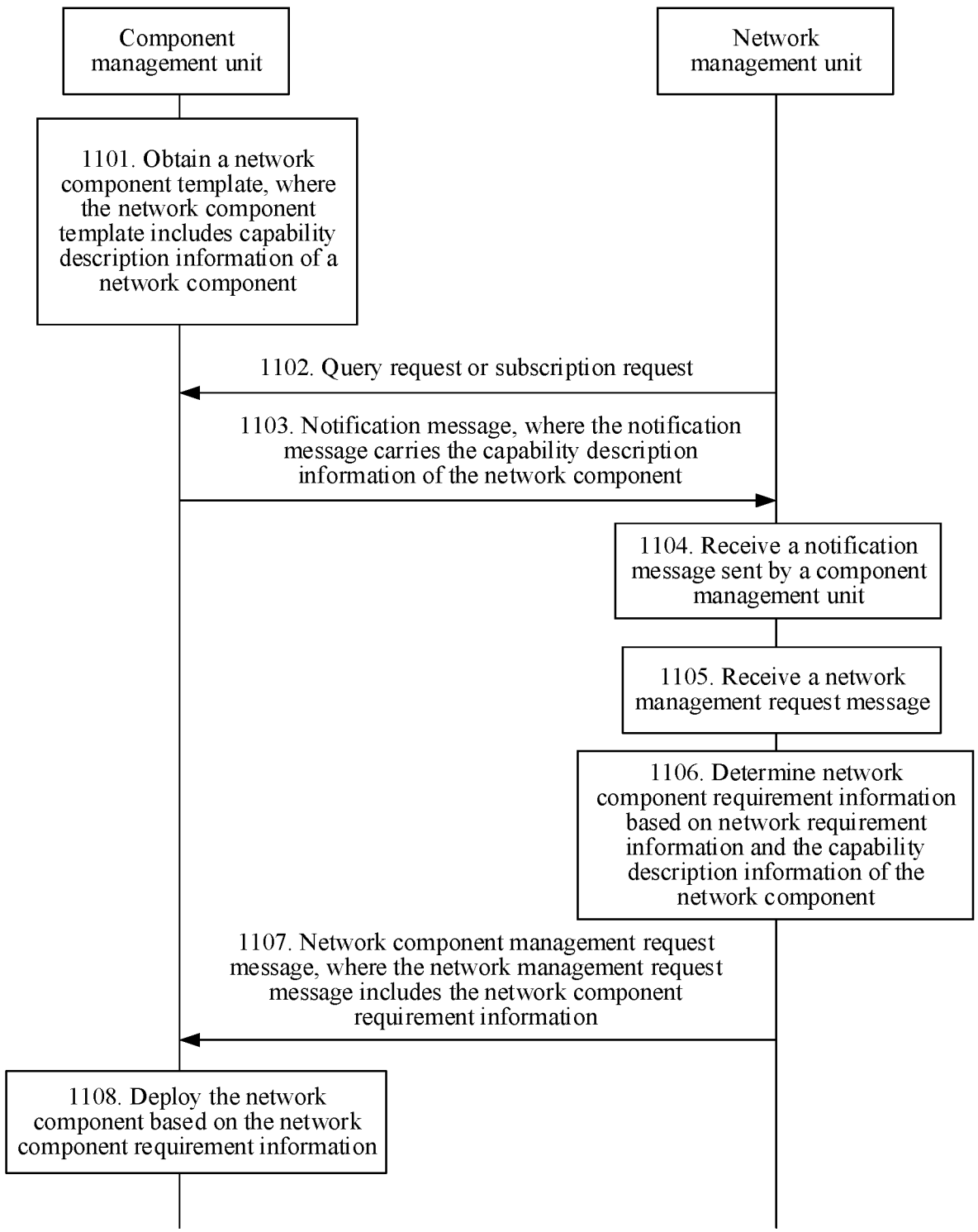
FIG. 11 is a flowchart of a network component management method according to this application.

Specifically, for the foregoing optional steps, refer to related descriptions in FIG. 11. Details are not described herein again.

The following describes the solution shown in FIG. 10 in detail by using an example in which the first network management unit is the component management unit in FIG. 1, and the second network management unit is the network management unit in FIG. 1.

FIG. 11 is a flowchart of a network slice management method according to this application. As shown in FIG. 11, the method may include the following steps.

Step 1101. A component management unit obtains a network component template, where the network component template includes capability description information of the network component.

For step 1101 and the capability description information of the network component in step 1101, refer to related descriptions in step 1001. Details are not described herein again.

Step 1102. A network management unit sends a query request or a subscription request to the component management unit.

The query request is used to query a capability provided by the component management unit, and the subscription request is used to subscribe the capability provided by the component management unit.

Step 1103. The component management unit receives the query request or the subscription request sent by the network management unit, and sends a notification message to the network management unit, where the notification message carries the capability description information of the network component.

Step 1104. The network management unit receives the notification message sent by the component management unit.

Step 1105. The network management unit receives a network management request message, where the network management request message carries network requirement information.

For step 1105 and the network requirement information, refer to related descriptions in the solution shown in FIG. 10. Details are not described herein again.

Step 1106. The network management unit determines the network component requirement information based on the network requirement information and the capability description information of the network component.

For a performing process of step 1106, refer to related descriptions in the solution shown in FIG. 10. Details are not described herein again.

Step 1107. The network management unit sends a network component management request message to the component management unit, where the network management request message includes the network component requirement information.

Step 1108. The component management unit receives the network component management request message, and deploys the network component based on the network component requirement information.

For a process of deploying the network component by the component management unit based on the network component requirement information in step 1108, refer to related descriptions in the solution shown in FIG. 10. Details are not described herein again.

It should be noted that in the solution shown in FIG. 11, an interval between step 1104 and step 1105 is determined based on the time at which the network management unit receives the network management request message. This does not mean that step 1105 is performed immediately after step 1104 is performed, and in some cases, step 1105 may be performed one or more days after step 1104 is performed. To be specific, after step 1104 is performed, the network management unit may store the capability description information of the network component carried by the notification message in the network management unit, and after step 1105 is performed, the network management unit performs subsequent steps based on the capability description information of the network slice.

Compared with the prior art, in the solution shown in FIG. 11, the network management unit coordinates with the component management unit to manage and deploy the network component, and the devices automatically manage the network component based on the capability description information of the network component in real time, to deploy the network slice, avoiding a manually negotiated network planning process, improving a network slice management and deployment efficiency, and shortening the service online time.

Figure 12:
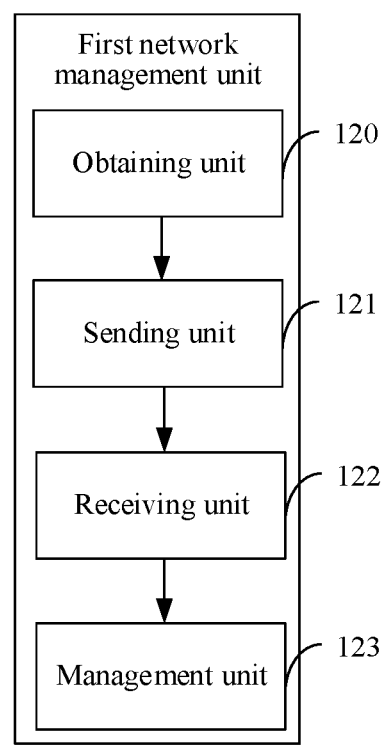
FIG. 12 is a schematic composition diagram of a first network management unit according to this application.

FIG. 12 is a schematic composition diagram of a first network management unit according to this application. The first network management unit may be the component management unit in FIG. 1, and the first network management unit may include an obtaining unit 120, a sending unit 121, a receiving unit 122, and a management unit 123.

The obtaining unit 120 is configured to obtain capability description information of a network component, where the capability description information of the network component includes at least one of network service description information and a deployment capability of the network component, and the network component includes at least one network service.

The sending unit 121 is configured to send a notification message to a second network management unit, where the notification message carries the capability description information of the network component.

In another embodiment of this application, the receiving unit 122 is configured to receive network component requirement information sent by the second network management unit; and the management unit 123 is further configured to deploy the network component based on the network component requirement information.

In another embodiment of this application, the network component requirement information includes the deployment information of the network component; and the management unit 123 is configured to: determine a quantity of instances of the network service and deployment information of the network service based on the deployment information of the network component; and deploy the network service based on the quantity of instances of the network service and the deployment information of the network service.

In another embodiment of this application, the obtaining unit 120 is further configured to: obtain a network component template, where the network component template includes the capability description information of the network component; and obtain the capability description information of the network component from the network component template.

In another embodiment of this application, the management unit 123 is further configured to record an association relationship between the network component and the network service included in the network component, in the first network management unit.

The foregoing embodiments merely briefly describe example working processes and functions of the obtaining unit 120, the sending unit 121, the receiving unit 122, and the management unit 123. All related content of the steps in the foregoing method embodiments may be quoted to functional descriptions of functional modules corresponding to the first network management unit. Details are not described herein again.

Figure 13:
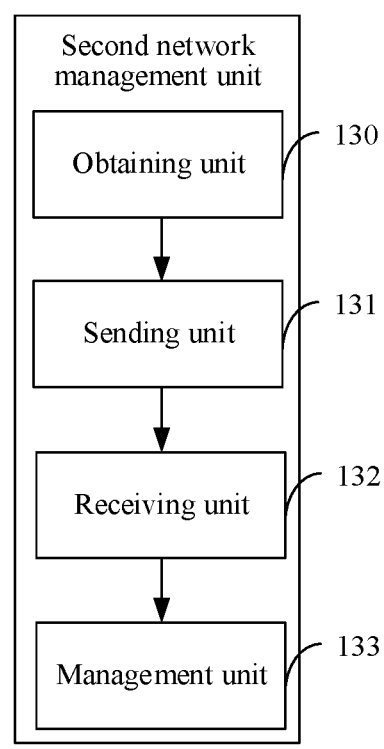
FIG. 13 is a schematic composition diagram of a second network management unit according to this application.

FIG. 13 is a second network management unit provided in this application. The second network management unit may be the network management unit in FIG. 1, and the apparatus may include an obtaining unit 130, a sending unit 131, a receiving unit 132, and a management unit 133.

The obtaining unit 130 is configured to obtain capability description information of a network component, where the capability description information of the network component includes at least one of network service description information and a deployment capability of the network component, and the network component includes at least one network service.

The management unit 133 is configured to manage the network component based on the capability description information of the network component.

In another embodiment of this application, the management unit 133 is configured to: receive a network management request message through the receiving unit 132, where the network management request message carries network requirement information;
  determine network component requirement information based on the capability description information of the network component and the network requirement information; and
  send the network component requirement information to the first network management unit through the sending unit 131.

In another embodiment of this application, the management unit 133 is configured to generate a network slice template based on the capability description information of the network component, where a network slice corresponding to the network slice template includes at least one network component.

In another embodiment of this application, the obtaining unit 130 is configured to receive a notification message from the first network management unit through the receiving unit 132, and obtain the capability description information of the network component from the notification message, where the notification message includes the capability description information of the network component; or
  the obtaining unit 130 is configured to obtain the network component template, and obtain the capability description information of the network component from the network component template, where the network component template includes the capability description information of the network component.

In another embodiment of this application, the capability description information of the network component is included in the network component template, and the management unit 133 is further configured to generate a network template based on the network component template, where the network template includes network service link description information, and the network service link description information is used to describe an association relationship between different network services.

The foregoing embodiments merely briefly describe example working processes and functions of the obtaining unit 130, the sending unit 131, the receiving unit 132, and the management unit 133. All related content of the steps in the foregoing method embodiments may be referenced by functional descriptions of functional modules corresponding to the first network management unit. Details are not described herein again.

The foregoing descriptions about implementations allow a person skilled in the art to clearly understand that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in a plurality of different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A network slice management method, comprising:
   obtaining, by a network management unit, capability description information of a network slice, wherein the capability description information of the network slice comprises at least one of a feature of the network slice and a deployment capability of the network slice;
   sending, by the network management unit, a notification message to a service management unit, wherein the notification message carries the capability description information of the network slice;
   receiving, by the network management unit, a network slice management request message sent by the service management unit, wherein the network slice management request message carries deployment information of the network slice, and the deployment information of the network slice corresponds to the deployment capability of the network slice; and
   managing, by the network management unit, the network slice based on the deployment information of the network slice;
   wherein the obtaining, by the network management unit, capability description information of the network slice comprises:
   obtaining, by the network management unit, a network slice template, wherein the network slice template comprises the capability description information of the network slice; and
   obtaining, by the network management unit, the capability description information of the network slice from the network slice template.

2. The method according to claim 1, wherein the managing, by the network management unit, the network slice based on the deployment information of the network slice comprises:
   determining, by the network management unit, deployment information of a network component based on the deployment information of the network slice, wherein the network slice comprises at least one network component; and
   sending, by the network management unit, the deployment information of the network component to a component management unit, wherein the deployment information of the network component is used to deploy the network component.

3. The method according to claim 1, wherein
   the notification message further carries an identifier of the network slice template, and the network slice management request message further carries the identifier of the network slice template;
   the notification message further carries the identifier of the network slice template and an identifier of a service descriptor corresponding to the capability description information of the network slice, and the network slice management request message further carries the identifier of the network slice template and the identifier of the service descriptor; or
   the notification message further carries the identifier of the service descriptor corresponding to the capability description information of the network slice, and the network slice management request message further carries the identifier of the service descriptor.

4. The method according to claim 1, wherein before the sending, by the network management unit, the notification message to the service management unit, the method further comprises:
   receiving, by the network management unit, a query request or a subscription request sent by the service management unit, wherein the query request is used to query a capability provided by the network management unit, or the subscription request is used to subscribe the capability provided by the network management unit.

5. The method according to claim 1, wherein the feature of the network slice comprises any one of the following pieces of information:

a service type, a type of the network slice, a success rate of service invocation, a success rate of service usage, a service or network coverage level, a service or network coverage area, a service or network latency, a throughput, a mobility of a terminal device, a data size, reliability information, and a minimum user rate.

6. The method according to claim 1, wherein the deployment capability of the network slice comprises at least one of the following pieces of information:
a service deployment area, a capacity, a service traffic model, an energy saving switch, a latency, a mobility of a terminal device, a success rate of service invocation, a success rate of service usage, a minimum user rate, an affinity, an anti-affinity, a security level, and an isolation level.

7. The method according to claim 1, further comprising:
receiving, by the service management unit, the notification message; and
managing, by the service management unit, the network slice based on the capability description information of the network slice.

8. A network slice management apparatus, comprising a processor, a memory, and a transceiver, wherein
the processor is configured to obtain capability description information of a network slice, wherein the capability description information of the network slice comprises at least one of a feature of the network slice and a deployment capability of the network slice;
the transceiver is configured to send a notification message to a service management unit, wherein the notification message carries the capability description information of the network slice;
the transceiver is further configured to receive a network slice management request message sent by the service management unit, wherein the network slice management request message carries deployment information of the network slice, and the deployment information of the network slice corresponds to the deployment capability of the network slice;
the processor is further configured to manage the network slice based on the deployment information of the network slice; and
the processor is configured to obtain a network slice template, and obtain the capability description information of the network slice from the network slice template, wherein the network slice template comprises the capability description information of the network slice.

9. The apparatus according to claim 8, wherein
the processor is configured to: determine deployment information of a network component based on the deployment information of the network slice, wherein the network slice comprises at least one network component; and
send the deployment information of the network component to a component management unit through the transceiver, wherein the deployment information of the network component is used to deploy the network component.

10. The apparatus according to claim 8, wherein
the notification message further carries an identifier of the network slice template, and the network slice management request message further carries the identifier of the network slice template;
the notification message further carries the identifier of the network slice template, and an identifier of a service descriptor corresponding to the capability description information of the network slice, and the network slice management request message further carries the identifier of the network slice template and the identifier of the service descriptor; or
the notification message further carries the identifier of the service descriptor corresponding to the capability description information of the network slice, and the network slice management request message further carries the identifier of the service descriptor.

11. The apparatus according to claim 8, wherein
the processor is further configured to: before the transceiver sends the capability description information of the network slice to the service management unit, receive, through the transceiver, a query request or a subscription request sent by the service management unit, wherein the query request is used to query a capability provided by the network management unit, or the subscription request is used to subscribe the capability provided by the network management unit.

12. The apparatus according to claim 8, wherein the feature of the network slice comprises any one of the following pieces of information:
a service type, a type of the network slice, a success rate of service invocation, a success rate of service usage, a service or network coverage level, a service or network coverage area, a service or network latency, a throughput, a mobility of a terminal device, a data size, reliability information, and a minimum user rate.

13. The apparatus according to claim 8, wherein the deployment capability of the network slice comprises at least one of the following pieces of information:
a service deployment area, a capacity, a service traffic model, an energy saving switch, a latency, a mobility of a terminal device, a success rate of service invocation, a success rate of service usage, a minimum user rate, an affinity, an anti-affinity, a security level, and an isolation level.

14. A system for managing a network slice, comprising a network management unit and a service management unit; wherein
the network management unit comprises a first processor and a first computer storage medium, the first computer storage medium is configured to store computer software instructions such that the network management unit is configured to obtain capability description information of the network slice, wherein the capability description information of the network slice comprises at least one of a feature of the network slice and a deployment capability of the network slice, and to send a notification message to a service management unit, wherein the notification message carries the capability description information of the network slice;
the service management unit comprises a second processor and a second computer storage medium, the second computer storage medium is configured to store computer software instructions such that the service management unit is configured to receive the notification message, wherein the capability description information of the network slice is used to describe a capability of the network slice, and to manage the network slice based on the capability description information of the network slice;
the service management unit is configured to send a network slice management request message to the network management unit, wherein the network slice management request message carries deployment information of the network slice, and the deployment information of the network slice corresponds to the deployment capability of the network slice; and the network management unit is configured to manage the network slice based on the deployment information of the network slice;

wherein the network management unit is configured to obtain capability description information of the network slice by:

obtaining, by the network management unit, a network slice template, wherein the network slice template comprises the capability description information of the network slice; and obtaining, by the network management unit, the capability description information of the network slice from the network slice template.

15. The system according to claim 14, wherein:

the service management unit is configured to send a query request or a subscription request to the network management unit, wherein the query request is used to query a capability provided by the network management unit or the subscription request is used to subscribe the capability provided by the network management unit.

* * * * *